US012389291B2

(12) United States Patent
Jin et al.

(10) Patent No.: US 12,389,291 B2
(45) Date of Patent: *Aug. 12, 2025

(54) UE AND BASE STATION IN MOBILE COMMUNICATION SYSTEM AND OPERATING METHOD THEREFOR

(71) Applicant: SAMSUNG ELECTRONICS CO., LTD., Suwon-si (KR)

(72) Inventors: Seungri Jin, Suwon-si (KR); Sangkyu Baek, Suwon-si (KR); Soenghun Kim, Suwon-si (KR); Hyunjeong Kang, Suwon-si (KR); June Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/667,999

(22) Filed: May 17, 2024

(65) Prior Publication Data

US 2024/0306056 A1    Sep. 12, 2024

Related U.S. Application Data

(63) Continuation of application No. 17/309,003, filed as application No. PCT/KR2019/013064 on Oct. 4, 2019, now Pat. No. 12,004,031.

(30) Foreign Application Priority Data

Oct. 11, 2018    (KR) .................. 10-2018-0121397

(51) Int. Cl.
*H04W 36/00* (2009.01)
*H04W 4/40* (2018.01)
(Continued)

(52) U.S. Cl.
CPC ....... *H04W 36/00837* (2018.08); *H04W 4/40* (2018.02); *H04W 36/0058* (2018.08);
(Continued)

(58) Field of Classification Search
CPC ............ H04W 36/00837; H04W 4/40; H04W 36/0058; H04W 74/0833; H04W 92/18;
(Continued)

(56) References Cited

U.S. PATENT DOCUMENTS 9,125,125 B2    9/2015 Jung et al.
9,294,972 B2    3/2016 Radulescu et al.
(Continued)

FOREIGN PATENT DOCUMENTS

KR    10-2011-0130350 A    12/2011
KR    10-2013-0028745 A    3/2013
(Continued)

OTHER PUBLICATIONS

International Search Report and Written Opinion of the International Searching Authority in connection with International Application No. PCT/KR2019/013064 dated Jan. 21, 2020, 11 pages.
(Continued)

*Primary Examiner* — Derrick V Rose

(57)    ABSTRACT

According to an aspect of the disclosure, a method of performing a conditional handover by a vehicle-to-everything (V2X) user equipment (UE) may include: transmitting a cell measurement report to a serving cell; receiving conditional handover configuration information from the serving cell; determining whether to perform a handover, based on the conditional handover configuration information; and when it is determined to perform the handover, performing random access to a target cell.

20 Claims, 22 Drawing Sheets

(51) Int. Cl.
  *H04W 36/08* (2009.01)
  *H04W 36/36* (2009.01)
  *H04W 74/0833* (2024.01)
  *H04W 92/18* (2009.01)

(52) U.S. Cl.
  CPC ... *H04W 36/00838* (2023.05); *H04W 36/085* (2023.05); *H04W 36/362* (2023.05); *H04W 74/0833* (2013.01); *H04W 92/18* (2013.01)

(58) Field of Classification Search
  CPC .......... H04W 36/0085; H04W 36/362; H04W 36/00838
  See application file for complete search history.

(56) References Cited

U.S. PATENT DOCUMENTS

| | | | |
|---|---|---|---|
| 12,004,031 B2* | 6/2024 | Jin | H04W 36/085 |
| 2018/0176710 A1 | 6/2018 | Jang et al. | |
| 2020/0329355 A1 | 10/2020 | Jang et al. | |
| 2020/0396658 A1 | 12/2020 | Szilagyi et al. | |
| 2022/0116839 A1 | 4/2022 | Tseng et al. | |

FOREIGN PATENT DOCUMENTS

| | | |
|---|---|---|
| KR | 10-2017-0053573 A | 5/2017 |
| KR | 10-2018-0070233 A | 6/2018 |
| WO | 2018156696 A1 | 8/2018 |
| WO | 2018175721 A1 | 9/2018 |

OTHER PUBLICATIONS

LG Electronics, "General aspects of Conditional HO," R2-1815498, 3GPP TSG-RAN WG2 Meeting #103bis, Chengdu, China, Oct. 8-12, 2018, 3 pages.

Vivo, "Signaling procedure for conditional handover," R2-1814194, 3GPP TSG-RAN WG2 Meeting #103bis, Chengdu, China, Oct. 8-12, 2018, 4 pages.

English Translation of the "Written Opinion of the International Searching Authority" issued Jan. 21, 2020, in connection with International Patent Application No. PCT/KR2019/013064, 18 pages.

Request for the Submission of an Opinion dated Apr. 6, 2023, in connection with Korean Application No. 10-2018-0121397, 13 pages.

Office Action dated Sep. 22, 2023, in connection with Korean Application No. 10-2018-0121397, 16 pages.

Notice of Allowance issued Apr. 5, 2024, in connection with Korean Patent Application No. 10-2018-0121397, 11 pages.

* cited by examiner

UE AND BASE STATION IN MOBILE COMMUNICATION SYSTEM AND OPERATING METHOD THEREFOR

CROSS-REFERENCE TO RELATED APPLICATIONS

This application is a continuation of application Ser. No. 17/309,003, filed Apr. 9, 2021, which is a 371 National Stage of International Application No. PCT/KR2019/013064, filed Oct. 4, 2019, which claims priority to Korean Patent Application No. 10-2018-0121397, filed Oct. 11, 2018, the disclosures of which are herein incorporated by reference in their entirety.

BACKGROUND

1. Field

The disclosure relates to a user equipment (UE) and a base station in a mobile communication system, and an operating method of the UE.

2. Description of Related Art

To meet the increasing demand with respect to wireless data traffic after the commercialization of $4^{th}$ generation (4G) communication systems, efforts have been made to develop $5^{th}$ generation (5G) or pre-5G communication systems. For this reason, 5G or pre-5G communication systems are called 'beyond 4G network' communication systems or 'post long-term evolution (post-LTE)' systems. A 5G communication system determined by the 3GPP is called a New Radio (NR) system. To achieve high data transfer rates, implementation of 5G communication systems in an ultra-high frequency (mmWave) band (e.g., a 60-GHz band) is being considered. To reduce path loss of radio waves and increase a transmission distance of radio waves in the ultra-high frequency band, for 5G communication systems, various technologies such as beamforming, massive multiple-input and multiple-output (massive MIMO), full-dimension MIMO (FD-MIMO), array antennas, analog beamforming, and large-scale antennas are being studied and applied to an NR system. To improve system networks, for 5G communication systems, various technologies such as evolved small cells, advanced small cells, cloud radio access networks (cloud-RAN), ultra-dense networks, device-to-device (D2D) communication, wireless backhaul, moving networks, cooperative communication, coordinated multi-points (CoMP), and reception interference cancellation have been developed. In addition, for 5G communication systems, advanced coding modulation (ACM) technologies, such as hybrid frequency-shift keying (FSK) and quadrature amplitude modulation (QAM) (FQAM) and sliding window superposition coding (SWSC), and advanced access technologies, such as filter bank multi-carrier (FBMC), non-orthogonal multiple access (NOMA), and sparse code multiple access (SCMA), have been developed.

The Internet has evolved from a human-based connection network whereby humans generate and consume information to the Internet-of-things (IoT) whereby distributed elements such as objects exchange information with each other to process the information. Internet-of-Everything (IoE) technology is also emerging, in which big data processing technology or the like is combined with IoT technology through a cloud server or the like. To implement the IoT, various technological elements such as sensing technology, wired/wireless communication and network infrastructures, service interface technology, and security technology are required. In recent years, technologies related to sensor networks for connecting objects, machine-to-machine (M2M) communication, and machine-type communication (MTC) have been studied. In an IoT environment, intelligent Internet technology (IT) services may be provided to collect and analyze data obtained from connected objects to generate new value in human life. As existing information technology (IT) and various industries converge and combine with each other, the IoT is applicable to various fields such as smart homes, smart buildings, smart cities, smart cars or connected cars, smart grids, health care, smart home appliances, and advanced medical services.

Various attempts are being made to apply 5G communication systems to the IoT network. For example, 5G communication such as sensor networks, M2M communication, MTC, or the like is implemented by technology such as beamforming, MIMO, array antennas, or the like. Application of the cloud RAN as the above-described big data processing technology may be an example of convergence of 5G communication technology and IoT technology.

As a variety of services can be provided owing to the development of mobile communication systems as described above, a method of effectively providing such services is required.

SUMMARY

Embodiments of the disclosure set forth herein are directed to providing an apparatus and method for effectively providing services in a mobile communication system.

According to an aspect of the disclosure, a method of performing a conditional handover by a vehicle-to-everything (V2X) user equipment (UE) includes: transmitting a cell measurement report to a serving cell; receiving conditional handover configuration information from the serving cell; determining whether to perform a handover, based on the conditional handover configuration information; and when it is determined to perform the handover, performing random access to a target cell.

According to another aspect of the disclosure, a method of performing a conditional handover by a serving cell includes: receiving a cell measurement report from a V2X UE; determining whether to configure the conditional handover with respect to the V2X UE, based on the cell measurement report; and when the conditional handover is configured with respect to the V2X UE, transmitting conditional handover configuration information to the V2X UE.

According to embodiments of the disclosure set forth herein, services can be effectively provided in a mobile communication system.

DETAILED DESCRIPTION

Figure 1:
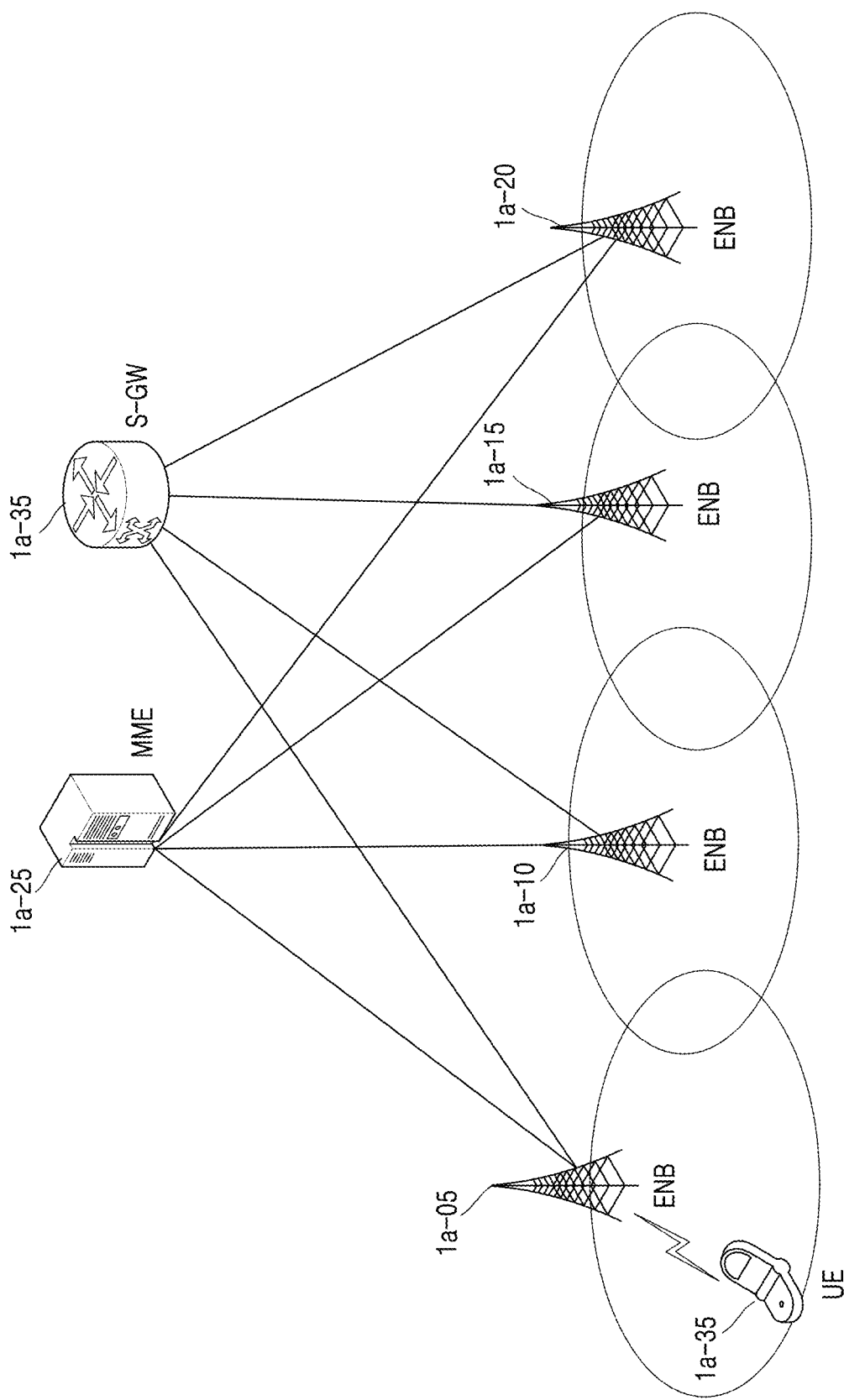
FIG. 1 is a diagram illustrating a configuration of a long-term evolution (LTE) system.

According to an aspect of the disclosure, a method of performing a conditional handover by a vehicle-to-everything (V2X) user equipment (UE) includes: transmitting a cell measurement report to a serving cell; receiving conditional handover configuration information from the serving cell; determining whether to perform a handover, based on the conditional handover configuration information; and when it is determined to perform the handover, performing random access to a target cell.

In an embodiment of the disclosure, the conditional handover configuration information may include at least one of: target cell identification information of at least one target cell; system information, for V2X, corresponding to each of the at least one target cell; random-access-related information; report configuration information; resource pool information for V2X; resource information for Uu communication; or a conditional handover triggering condition. The conditional handover triggering condition may include at least one of: a threshold of the serving cell; a threshold of the target cell; a time period in which quality of the target cell is required to be higher than the threshold of the target cell; or a time period in which the conditional handover configuration information is valid.

In an embodiment of the disclosure, when it is determined to perform the handover, the method may further include transmitting a notification about the performance of the handover to the target cell.

In an embodiment of the disclosure, the conditional handover configuration information may include at least one of: target cell group information regarding at least one target cell group; system information, for V2X, corresponding to each target cell included in the at least one target cell group; random-access-related information; report configuration information; resource pool information for V2X; resource information for Uu communication; or a conditional handover triggering condition. The at least one target cell group may include at least one target cell to which priority is assigned. The conditional handover triggering condition may include at least one of: a threshold of the serving cell; a threshold of the target cell; a time period in which quality of the target cell is required to be higher than the threshold of the target cell; or a time period in which the conditional handover configuration information is valid.

In an embodiment of the disclosure, when it is determined to perform the handover, the performing of random access to the target cell may include selecting a target cell group, based on the target cell group information; and performing random access to a target cell to which highest priority is assigned among target cells included in the selected target cell group.

In an embodiment of the disclosure, after the handover is performed, the method may further include updating the conditional handover configuration information.

In an embodiment of the disclosure, the method may further include transmitting, to the serving cell, user equipment (UE) capability information indicating that conditional handover is supportable.

According to another aspect of the disclosure, a method of performing a conditional handover by a serving cell includes: receiving a cell measurement report from a V2X UE; determining whether to configure the conditional handover with respect to the V2X UE, based on the cell measurement report; and when the conditional handover is configured with respect to the V2X UE, transmitting conditional handover configuration information to the V2X UE.

In an embodiment of the disclosure, the conditional handover configuration information may include at least one of: target cell identification information of at least one target cell; system information, for V2X, corresponding to each of the at least one target cell; random-access-related information; report configuration information; resource pool information for V2X; resource information for Uu communication; or a conditional handover triggering condition. The conditional handover triggering condition may include at least one of: a threshold of the serving cell; a threshold of the target cell; a time period in which quality of the target cell is required to be higher than the threshold of the target cell; or a time period in which the conditional handover configuration information is valid.

In an embodiment of the disclosure, the conditional handover configuration information may include at least one of: target cell group information regarding at least one target cell group; system information, for V2X, corresponding to each target cell included in the at least one target cell group; random-access-related information; report configuration information; resource pool information for V2X; resource information for Uu communication; or a conditional handover triggering condition. The at least one target cell group may include at least one target cell to which priority is assigned. The conditional handover triggering condition may include at least one of: a threshold of the serving cell; a threshold of the target cell; a time period in which quality of the target cell is required to be higher than the threshold of the target cell; or a time period in which the conditional handover configuration information is valid.

In an embodiment of the disclosure, the method may further include, when a notification about performance of the conditional handover is received from the V2X UE, transmitting, by the V2X UE, a sequence number (SN) status for at least one of uplink data or downlink data for the V2X UE to a target cell to which the conditional handover is to be performed.

In an embodiment of the disclosure, when there is downlink data to be transmitted to the V2X UE, transmitting the downlink data to the target cell.

In an embodiment of the disclosure, the method may further include, when it is determined to configure the conditional handover with respect to the V2X UE, transmitting, by the V2X UE, a handover request to the target cell to which the conditional handover is to be performed; and receiving a response to the handover request from the target cell.

According to another aspect of the disclosure, a V2X UE for performing a conditional handover includes: a transceiver; and a controller configured to: transmit a cell measurement report to a serving cell; receive conditional handover configuration information from the serving cell; determine whether to perform a handover, based on the conditional handover configuration information; and perform random access to a target cell when it is determined to perform the handover.

According to another aspect of the disclosure, a base station for performing a conditional handover includes: a transceiver; and a controller configured to: receive a cell measurement report from a V2X UE; determine whether to configure the conditional handover with respect to the V2X UE, based on the cell measurement report; and transmit conditional handover configuration information to the V2X UE when it is determined to configure the conditional handover with respect to the V2X UE.

Hereinafter, embodiments of the disclosure will be described in detail with reference to the accompanying drawings.

When embodiments of the disclosure are described herein, a description of techniques which are well known in the technical field to which the disclosure pertains and are not directly related to the disclosure will be omitted. This is to more clearly convey the gist of the disclosure by omitting unnecessary description.

For the same reason, some components are exaggerated, omitted, or schematically illustrated in the accompanying drawings. The size of each component does not entirely reflect the actual size thereof. The same reference numerals are allocated to the same or corresponding elements in each drawing.

Advantages and features of the disclosure and methods of achieving them will be apparent from embodiments of the disclosure described in detail, in conjunction with the accompanying drawings. However, the disclosure is not limited to the embodiments thereof below and may be embodied in many different forms. Rather, these embodiments are provided so that this disclosure will be thorough and complete and will fully convey the concept of the disclosure to those of ordinary skill in the art. The disclosure should be defined by the scope of the claims. The same reference numerals refer to the same components throughout the specification.

In this case, it will be understood that each block of process flowcharts and combinations of the flowcharts may be performed by computer program instructions. The computer program instructions may be installed in a processor of a general-purpose computer, special-purpose computer, or other programmable data processing equipment, so that means to perform functions described in blocks of each flowchart may be produced by instructions executed by the processor of the computer or the other programmable data processing equipment. The computer program instructions may be stored in a computer usable or readable memory oriented to a computer or other programmable data processing equipment to implement functions in a particular way. Thus, an article of manufacture, including an instruction means for performing the function described in a block (or blocks) of each flowchart, may be produced by the instructions stored in the computer usable or readable memory. Because the computer program instructions may be stored in a computer or other programmable data processing equipment, the functions of the blocks of each flowchart may be provided by the instructions performing a series of operations in the computer or the other programmable data processing equipment to produce a process executable by the computer to generate a computer programmable instructions to operate the computer or the other data processing equipment.

In addition, each block may represent a module, segment, or part of code that includes one or more executable instructions for executing specified logical function(s). It should be noted that in some alternative embodiments of the disclosure, the functions described in the blocks may be performed in an order different from that described herein. For example, two blocks illustrated consecutively may be performed substantially simultaneously or performed in a reverse order according to functions corresponding thereto in some cases.

In this case, the term 'unit' used in embodiments set forth herein represents software or hardware components such as FPGA or ASIC, and a '~ unit' performs certain roles. However, the term "unit" is not limited to software or hardware. The term "unit" may be configured to be stored in an addressable storage medium or to reproduce one or more processors. Thus, the term "unit" may include, for example, components, such as software components, object-oriented software components, class components, and task components, processes, functions, attributes, procedures, subroutines, segments of program code, drivers, firmware, microcode, a circuit, data, database, data structures, tables, arrays, and parameters. Components and functions provided in "units" may be combined to a smaller number of components and "units" or may be divided into sub-components and "sub-units". In addition, the components and "units" may be implemented to execute one or more CPUs in a device or a secure multimedia card. In an embodiment of the disclosure, a "unit" may include one or more processors.

As used herein, terms used to identify a connection node, terms referring to network entities, terms referring to messages, a term referring to interface between network entities, terms referring to various types of identification information, and the like are examples provided for convenience of explanation. Accordingly, the disclosure is not limited to terms described below and other terms indicating objects having equivalent technical meanings may be used.

For convenience of description, terms and names defined in the standards of 5G, NR, and LTE systems are used in the present disclosure. However, the disclosure is not limited by these terms and names and is equally applicable to systems conforming to other standards.

That is, embodiments of the disclosure will be described in detail mainly with respect to communication standards defined by the 3GPP. However, the main subject of the disclosure may be applied to other communication systems having a similar technical background, by making slight changes therein without departing from the scope of the disclosure, as judged by those of ordinary skill in the technical field of the disclosure.

In the disclosure, an operation of conditionally supporting a handover to support vehicle-to-everything (V2X) defined in a next-generation communication system (5G or NR system) will be described. As V2X is introduced in the next-generation communication system (5G or NR system), there is a need for a method of improving mobility according to a high data rate and a high-speed movement of a UE during a V2X operation.

According to the disclosure, when an inter-cell handover is performed for an NR V2X UE, the NR V2X UE may perform a handover according to conditions, based on already set information, and thus, a handover procedure may be simplified, a high data rate to be considered in the NR system may be supported, and mobility may be efficiently supported according to high-speed movement.

FIG. 1 is a diagram illustrating a configuration of a long-term evolution (LTE) system.

As illustrated in FIG. 1, a radio access network of the LTE system includes a plurality of evolved Nodes B (hereinafter referred to as eNBs, Nodes B or base stations) 1a-05, 1a-10, 1a-15, and 1a-20, a Mobility Management Entity (MME) 1a-25, and a Serving-Gateway (S-GW) 1a-30. A user equipment (hereinafter referred to as a UE or a terminal) 1a-35 accesses an external network through the eNBs 1a-05, 1a-10, 1a-15, and 1a-20 and the S-GW 1a-30.

The evolved Nodes B (hereinafter referred to as eNBs, Nodes B or base stations) 1a-05, 1a-10, 1a-15, and 1a-20 are access nodes of a cellular network and provide wireless access to UEs accessing the network. That is, the eNBs 1a-05, 1a-10, 1a-15, and 1a-20 collect status information, such as a buffer state, an available transmission power state, and a channel state, of UEs and perform scheduling to support connection between UEs and a core network (CN) so as to service users' traffic.

The eNBs 1a-05, 1a-10, 1a-15, and 1a-20 may correspond to an existing Node B of a Universal Mobile Telecommunications System (UMTS). An eNB 1a-05 may be connected to a UE 1a-35 through a radio channel and perform a more complicated role than an existing Node B. In the LTE system, all user traffic, including real-time services such as Voice over IP (VOIP) through an Internet protocol, are serviced through a shared channel, and thus, an entity for performing scheduling by collecting status information such as buffer states of UEs, available transmission power status, and channel status is needed. The eNBs 1a-05, 1a-10, 1a-15 and a-20 function as such an entity. Generally, one gNB may control a plurality of cells. For example, in order to realize a transmission rate of 100 Mbps, the LTE system uses an orthogonal frequency division multiplexing (hereinafter referred to as OFDM) as radio access technology in a 20 MHz bandwidth. In addition, an adaptive modulation & coding (hereinafter referred to as AMC) scheme is applied to determine a modulation scheme and a channel coding rate according to a channel state of a UE.

The MMF 1a-25 is an entity that performs various control functions as well as UE mobility management and is connected to a plurality of eNBs. The S-GW 1a-30 is an entity that provides a data bearer. The MME 1a-25 and the S-GW 1a-30 may authenticate UEs accessing the network, perform bearer management, etc., and process packets received from or to be transmitted to the eNBs 1a-05, 1a-10, 1a-15 and 1a-20.

Figure 2:
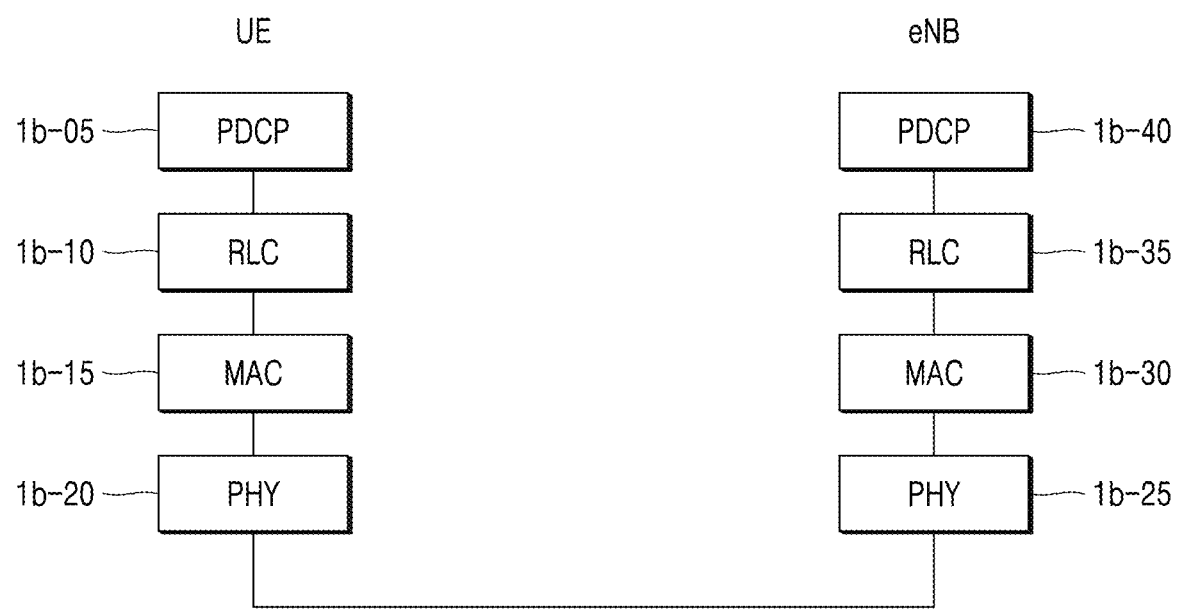
FIG. 2 is a diagram illustrating a radio protocol architecture in an LTE system.

FIG. 2 is a diagram illustrating a radio protocol architecture in an LTE system.

Referring to FIG. 2, the radio protocol architecture of the LTE system includes Packet Data Convergence Protocols (PDCPs) 1b-05 and 1b-40, Radio Link Controls (RLCs) 1b-10 and 1b-35, and Medium Access Controls (MACs) 1b-15 and 1b-30 of a UE and an eNB. The PDCPs 1b-05 and 1b-40 perform IP header compression/reconstruction and the like. Main functions of a PDCP may be summarized as follows:

header compression and decompression: ROHC only;
transfer of user data;
in-sequence delivery of upper layer PDUs at PDCP re-establishment procedure for RLC AM;
reordering (for split bearers in DC (only support for RLC AM): PDCP PDU routing for transmission and PDCP PDU reordering for reception);
duplicate detection of lower layer SDUs at PDCP re-establishment procedure for RLC AM;
retransmission of PDCP SDUs at handover and, for split bearers in DC, of PDCP PDUs at PDCP data-recovery procedure, for RLC AM;
ciphering and deciphering; and
timer-based SDU discarding in uplink The radio link controls (hereinafter referred to as RLCs) 1b-10 and 1b-35 reconstruct a PDCP packet data unit (PDU) in an appropriate size to perform an ARQ operation and the like. Main functions of an RLC may be summarized as follows:

transfer of upper layer PDUs;
ARQ function (error correction through ARQ (only for AM data transfer));
concatenation, segmentation and reassembly of RLC SDUs (only for UM and AM data transfer);

re-segmentation of RLC data PDUs (only for AM data transfer);
reordering of RLC data PDUs (only for UM and AM data transfer);
duplicate detection (only for UM and AM data transfer);
protocol error detection (only for AM data transfer);
RLC SDU discarding (only for UM and AM data transfer); and
RLC re-establishment The MACs 1b-15 and 1b-30 are connected to several RLC layer entities configured in one UE, and multiplex RLC PDUs to MAC PDUs and demultiplex RLC PDUs from MAC PDUs. Main functions of a MAC may be summarized as follows:
mapping between logical channels and transport channels;
multiplexing/demultiplexing of MAC SDUs belonging to one or different logical channels into/from transport blocks (TB) delivered to/from the physical layer on transport channels;
scheduling information reporting;
HARQ function (error correction through HARQ);
priority handling between logical channels of one UE;
priority handling between UEs by means of dynamic scheduling;
MBMS service identification;
transport format selection; and
padding.

Physical layers 1b-20 and 1b-25 channel-code and modulate higher-layer data into an OFDM symbol and transmit the OFDM symbol through a radio channel, or demodulate and channel-decode an OFDM symbol received through the radio channel and transmit resultant data to an upper layer.

Hybrid ARQ (HARQ) may be also used at a physical layer for additional error correction, and a receiving side may transmit 1-bit information indicating whether a packet transmitted from a transmitting side is received. The 1-bit information is called HARQ ACK/NACK information. Downlink HARQ ACK/NACK information for uplink transmission may be transmitted through a Physical Hybrid-ARQ Indicator Channel (PHICH), and uplink HARQ ACK/NACK information for downlink transmission may be transmitted through a Physical Uplink Control Channel (PUCCH) or a Physical Uplink Shared Channel (PUSCH).

The physical layers 1b-20 and 1b-25 may include one or more frequencies/carriers, and a technology for simultaneously setting and using a plurality of frequencies is called a carrier aggregation (hereinafter referred to as CA) technology. Through the CA technology, for communication between a terminal (or user equipment (UE)) and a base station (E-UTRAN Node B or eNB), a primary carrier and one or more subcarriers can be used rather than using only one carrier and thus traffic can be dramatically increased by the number of subcarriers. In the LTE system, a cell, which is included in a base station and uses a primary carrier, is referred to as a primary cell (PCell), and a cell, which is included in the base station and uses a subcarrier, is referred to as a secondary cell (SCell).

Although not shown in FIG. 2, there are Radio Resource Control (RRC) layers above the PDCP layers 1b-05 and 1b-40 of the UE and the eNB, and configuration control messages related to accessing and measurement for radio resource control may be exchanged through the RRC layers.

Figure 3:
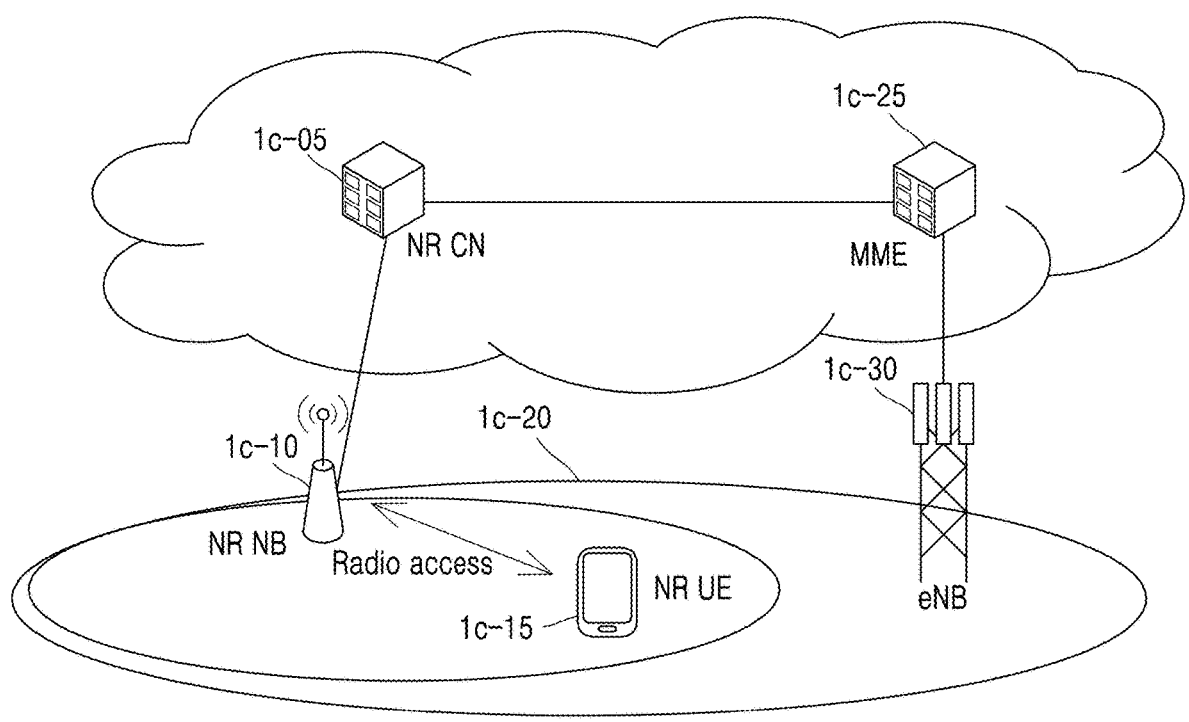
FIG. 3 is a diagram illustrating a configuration of a next-generation mobile communication system to which an embodiment of the disclosure is applied.

FIG. 3 is a diagram illustrating a configuration of a next-generation mobile communication system to which an embodiment of the disclosure is applied.

Referring to FIG. 3, a radio access network of a next-generation mobile communication system (NR or 5G system) includes a new radio node B (hereinafter referred to as an NR NB, an NR gNB or an NR base station) 1c-10 and a new radio core network (or next-generation core network (NG CN)) 1c-05. A new radio user equipment (hereinafter referred to as NR UE or UE) 1c-15 is connected to an external network through the NR gNB 1c-10 and the NR CN 1c-05.

In FIG. 3, the NR gNB 1c-10 corresponds to an Evolved Node B (eNB) of an LTE system. The NR gNB 1c-10 is connected to the NR UE 1c-15 through a wireless channel and may provide better services than an existing Node B. In the next-generation mobile communication system, because all user traffic is serviced through a shared channel, an entity for scheduling by collecting status information, such as a buffer state, an available transmission power state, and a channel state, of UEs is needed and the NR gNB 1c-10 serves as the entity. One NR gNB 1c-10 generally controls a plurality of cells, and includes a central unit (CU) in charge of control and signaling and a distributed unit (DU) in charge of transmission and reception of signals. The next-generation mobile communication system (5G or NR system) may have a maximum bandwidth equal to or greater than an existing maximum bandwidth to implement an ultra-high data transmission rate compared to an LTE system, and beamforming technology may be additionally applied thereto using orthogonal frequency division multiplexing (OFDM) as a wireless access technology. In addition, an adaptive modulation & coding (AMC) scheme may be applied to determine a modulation scheme and a channel coding rate according to a channel state of a UE. The NR CN 1c-05 performs functions such as mobility support, a bearer configuration, and a quality of service (QOS) configuration. The NR CN 1c-05 is an entity that performs various control functions as well as UE mobility management and is connected to a plurality of gNBs. In addition, the next-generation mobile communication system (5G or NR system) may be connected with the LTE system, and the NR CN 1c-05 may be connected to the MME 1c-25 through a network interface. The MME 1c-25 is connected to an eNB 1c-30 which is an existing base station.

Figure 4:
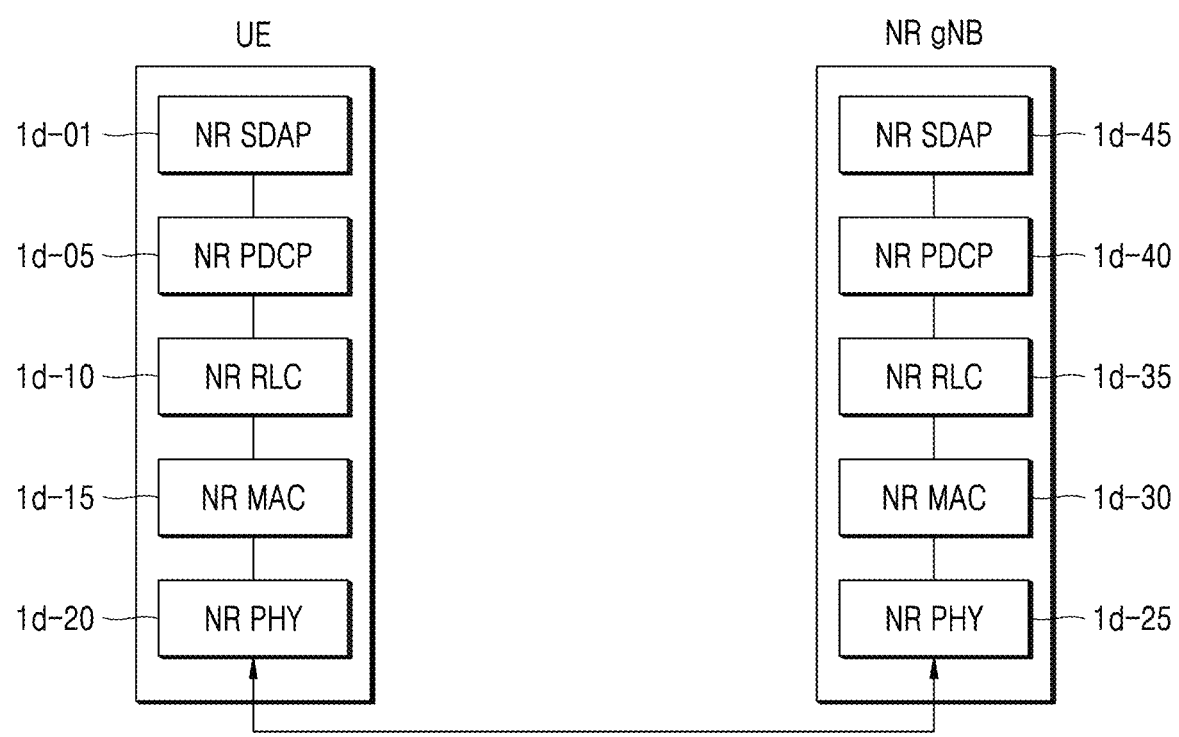
FIG. 4 is a diagram illustrating a radio protocol architecture of a next-generation mobile communication system to which an embodiment of the disclosure is applied.

FIG. 4 is a diagram illustrating a radio protocol architecture of a next-generation mobile communication system to which an embodiment of the disclosure is applied.

Referring to FIG. 4, the radio protocol architecture of the next-generation mobile communication system (5G or NR system) includes NR SDAPs 1d-01 and 1d-45, NR PDCPs 1d-05 and 1d-40, NR RLCs 1d-10 and 1d-35, and NR MACs 1d-15 and 1d-30 of an UE and an NR gNB.

Main functions of the NR SDAPs 1d-01 and 1d-45 may include some of the following functions:
transfer of user plane data;
mapping between a QoS flow and a data radio bearer (DRB) for both a downlink (DL) and an uplink (UL);
marking QoS flow ID in both DL and UL packets; and
mapping a reflective QoS flow to a DRB for UL SDAP PDUs.

With respect to an SDAP layer, the UE may receive an RRC message indicating
a configuration with respect to whether to use a header of the SDAP layer or whether to use a function of the SDAP layer for each PDCP layer entity, each bearer, or each logical channel. When an SDAP header is configured, a 1-bit NAS reflective QoS indicator and a 1-bit AS reflective QoS indicator of the SDAP header may indicate the UE to update or reconfigure mapping information between a QoS flow and a DRB for an uplink and a downlink. The SDAP header may include QoS flow ID information indicating QoS. QoS information may be used as data processing priority, scheduling information or the like to support seamless services.

Main functions of the NR PDCPs 1*d*-05 and 1*d*-40 may include some of the following functions:
- header compression and decompression: ROHC only;
- transfer of user data;
- in-sequence delivery of upper layer PDUs;
- out-of-sequence delivery of upper layer PDUs;
- PDCP PDU reordering for reception;
- duplicate detection of lower layer SDUs;
- retransmission of PDCP SDUs;
- ciphering and deciphering; and
- timer-based SDU discarding in uplink Here, a reordering function of an NR PDCP entity refers to a function of reordering PDCP PDUs received from a lower layer in order according to a PDCP sequence number (SN), and may include a function of transmitting data to an upper layer in the reordering order or a function of directly transmitting the data to the upper layer regardless of the reordering order, a function of recording lost PDCP PDUs by reordering the PDCP PDUs, a function of reporting a state of the lost PDCP PDUs to a transmitting side, and a function of requesting retransmission of the lost PDCP PDUs.

Main functions of the NR RLCs 2*d*-10 and 2*d*-35 may include some of the following functions:
- transfer of upper layer PDUs;
- in-sequence delivery of upper layer PDUs;
- out-of-sequence delivery of upper layer PDUs;
- ARQ function (error correction through ARQ);
- concatenation, segmentation and reassembly of RLC SDUs;
- re-segmentation of RLC data PDUs;
- reordering of RLC data PDUs;
- duplicate detection;
- protocol error detection;
- RLC SDU discarding; and
- RLC re-establishment Here, the in-sequence delivery of the NR RLC entity refers to a function of delivering RLC SDUs received from a lower layer to an upper layer in order. More specifically, the in-sequence delivery may include a function of reassembling RLC SDUs and transmitting a result of the reassembling when one RLC SDU is received by being divided into the several RLC SDUs, a function of rearranging received RLC PDUs according to an RLC sequence number (SN) or a PDCP SN, a function of recording lost RLC PDUs by reordering the RLC PDUs, a function of reporting a status of lost RLC PDUs to a transmitting side, a function of requesting retransmission of lost RLC PDUs, a function of delivering only RLC SDUs, in order, before lost RLC SDU to an upper layer when there are lost RLC SDUs, a function of delivering all RLC SDUs, which are received before the start of a timer, in order when the timer expires even when there are lost RLC SDUs, a function of delivering all RLC SDUs received so far to the upper layer when a timer expires even when there are lost RLC SDUs, and the like.

In this case, the RLC PDUs may be processed in the order in which they are received (in the order of arrival regardless of a serial number order or a sequence number order) and transmitted to a PDCP entity in any order (out-of-sequence delivery). Segments stored in a buffer or to be received at a later time may be received and reconstructed into a complete RLC PDU, and the RLC PDU may be processed and transmitted to the PDCP entity. An NR RLC layer may not include a concatenation function, and the concatenation function may be performed by an NR MAC layer or replaced by a multiplexing function of the NR MAC layer.

Here, the out-of-sequence delivery function of the NR RLC entity refers to a function of directly transmitting RLC SDUs received from a lower layer to an upper layer in any order, and includes a function of reassembling and transmitting RLC SDUs when one RLC SDU is received by being divided into the RLC SDUs and a function of recording lost RLC PDUs by storing an RLC SN or PDCP SN of the received RLC PDUs and reordering the RLC PDUs.

The NR MACs 1*d*-15 and 1*d*-30 may be connected to several NR RLC layer entities of one UE, and main functions thereof may include some of the following functions:
- mapping between logical channels and transport channels;
- multiplexing/demultiplexing of MAC SDUs;
- scheduling information reporting;
- HARQ function (error correction through HARQ);
- priority handling between logical channels of one UE;
- priority handling between UEs by means of dynamic scheduling;
- MBMS service identification;
- transport format selection; and
- padding.

The NR PHY layers 1*d*-20 and 1*d*-25 channel-code and modulate higher-layer
data into an OFDM symbol and transmit the OFDM symbol through a radio channel, and demodulate and channel-decode an OFDM symbol received through the radio channel and transmit resultant data to an upper layer.

Figure 5:
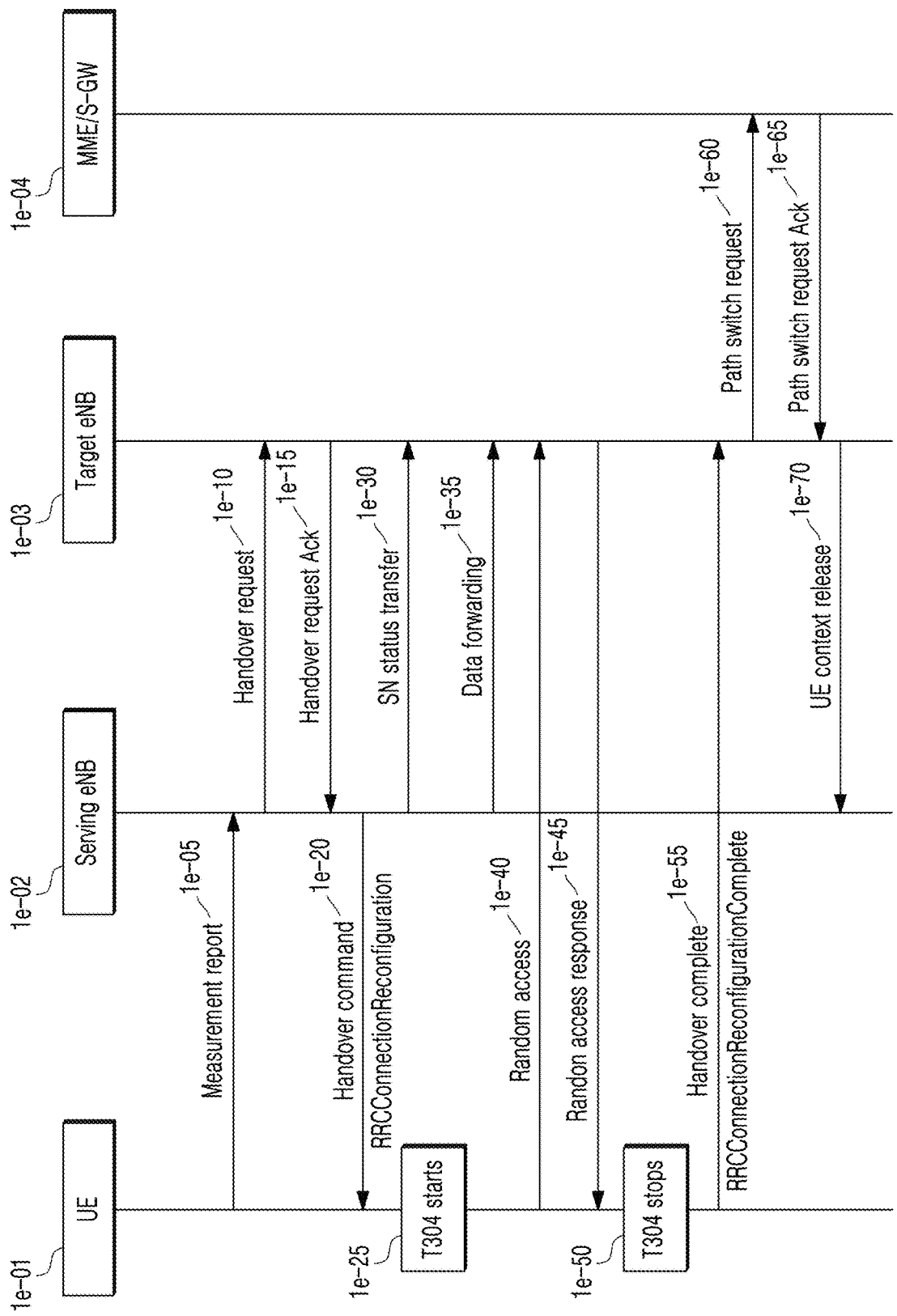
FIG. 5 is a diagram illustrating a process of performing a handover in an LTE system.

FIG. 5 is a diagram illustrating a process of performing a handover in an LTE system.

Referring to FIG. 5, a UE 1*e*-01 that is in the connected mode transmits a cell measurement report to a current serving eNB 1*e*-02 when a periodic or certain event is satisfied (1*e*-05). The serving eNB 1*e*-02 determines whether the UE 1*e*-01 is to perform a handover to an adjacent cell, based on the cell measurement report. The handover is an operation of changing a serving cell, which provides a service to a UE that is in the connected mode, to another eNB. When a serving cell determines to perform a handover, the serving cell requests a new eNB, i.e., a target eNB 1*e*-03, which is to provide a service to the UE 1*e*-01, to perform a handover by transmitting a handover (HO) request message to the target eNB 1*e*-03. When the target cell 1*e*-03 accepts the request to perform the handover, the target eNB 1*e*-03 transmits a HO request acknowledgement (ACK) message to the serving cell (1*e*-15). The serving cell receiving the HO request ACK message transmits a HO command message to the UE 1*e*-01 (1*e*-20). Before receiving the HO command message, the UE 1*e*-01 transmits an uplink channel PUSCH/PUCCH while continuously receiving a downlink channel PDCCH/PDSCH/PHICH from the serving cell. The HO command message is transmitted by the serving cell to the UE 1*e*-01 by using a radio resource control (RRC) connection reconfiguration message (1*e*-20). When the UE 1*e*-01 receives the RRC connection reconfiguration message, the UE 1*e*-01 stops transmitting and receiving data with the serving cell and starts a T304 timer. The T304 timer causes the UE 1*e*-01 to return to an original configuration and to change to an RRC idle state when the UE 1*e*-01 does not succeed in performing a handover to a target cell for a certain time. The serving cell transmits a sequence number (SN) status for uplink/downlink data and transmits downlink data to the target cell when there is the downlink data (1*e*-30 and 1*e*-35).

The UE 1e-01 attempts to perform random access to a target cell indicated by the serving cell (1e-40). The random access is performed to inform the target cell of movement of the UE 1e-01 and to synchronize with an uplink through the handover. For the random access, the UE 1e-01 transmits to the target cell a preamble identifier (ID) provided from the serving cell or a preamble corresponding to a randomly selected preamble ID. After the preamble is transmitted, the UE 1e-01 monitors whether a random access response (RAR) message is transmitted from the target cell after a certain number of subframes. A time section in which the monitoring is performed is referred to as a random access response (RAR) window. When a RAR is received within a certain time (1e-45), the UE 1e-01 transmits a HO complete message in an RRCConnectionReconfigurationComplete message to the target cell (1e-55). Thereafter, the UE 1e-01 transmits an uplink channel PUSCH/PUCCH while continuously receiving a downlink channel PDCCH/PDSCH/PHICH from the target cell. As described above, when the RAR is successfully received from the target cell, the UE 1e-01 ends the T304 timer (1e-50). The target cell requests path correction to correct paths of bearers set as serving cells (1e-60 and 1e-65) and notifies the serving cell to delete UE context of the UE 1e-01 (1e-70). Accordingly, the UE 1e-01 attempts to receive data from the start of the RAR window for the target cell, and starts transmission of the data to the target cell while transmitting the RRCConnectionReconfigurationComplete message, after the RAR is received.

Figure 6:
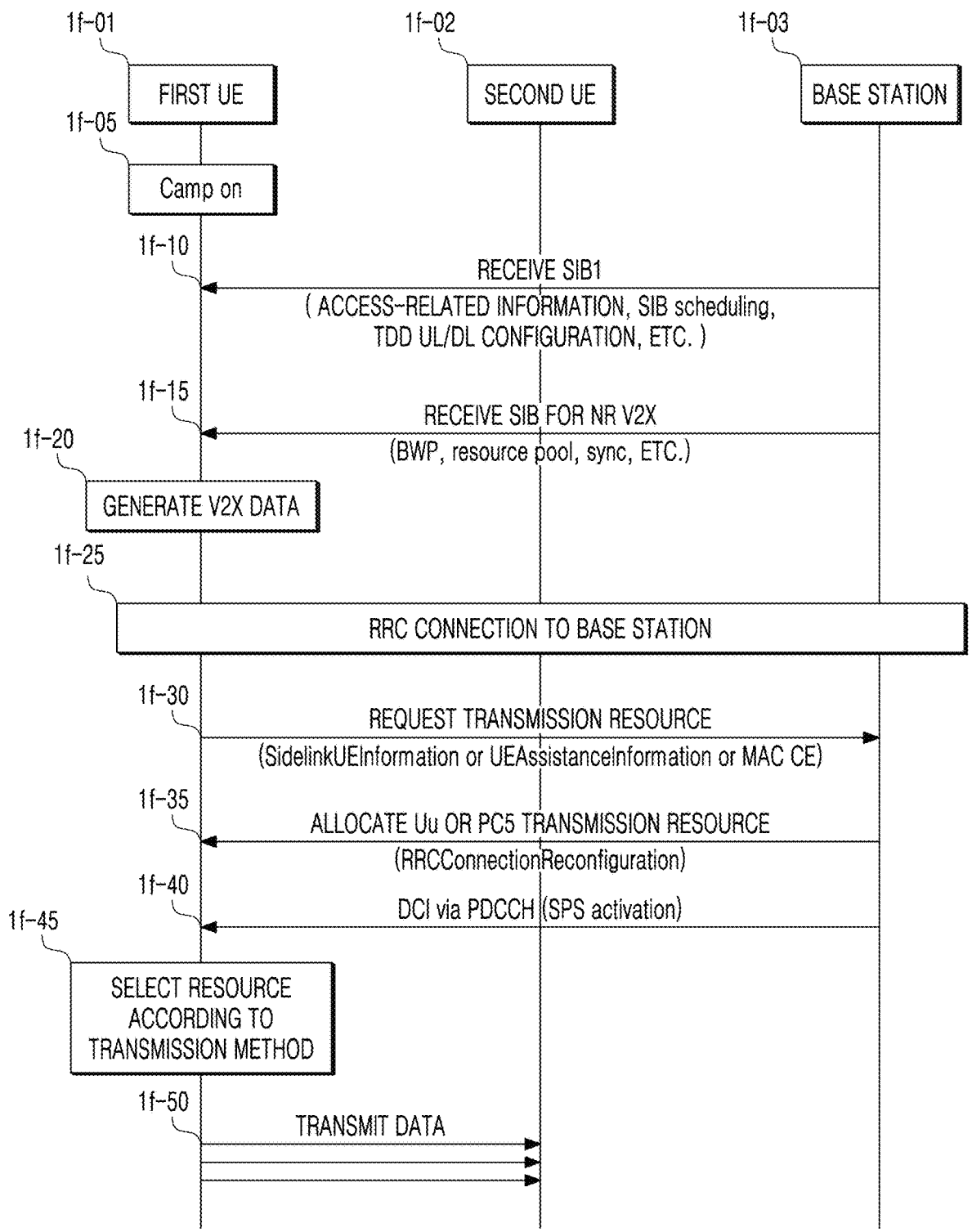
FIG. 6 is a diagram illustrating a data transmission procedure of a new radio vehicle-to-everything (NR V2X) user equipment (UE) operating in a base station scheduling mode (NR mode 1) in an NR system to which an embodiment of the disclosure is applied.

FIG. 6 is a diagram illustrating a data transmission procedure of an NR V2X UE operating in a base station scheduling mode (NR mode 1) in an NR system to which an embodiment of the disclosure is applied.

Referring to FIG. 6, a first UE 1f-01 camping on (1f-05) receives SIB1, which is basic information for accessing a corresponding serving cell, from a base station 1f-03 (1f-10), and thereafter receives system information for NR V2X (SIB for NR V2X) (1f-15). The SIB1 may include cell-access-related information, scheduling information of other system information, and TDD UL/DL configuration of the corresponding serving cell. The system information for NR V2X may include resource pool information for sidelink data transmission and reception, configuration information for a sensing operation, synchronization configuration information, inter-frequency transmission and reception, and the like.

V2X-related system information should be provided from a base station and a cell that support V2X regardless of a request from a UE, because the UE should be operable even in the RRC connection state and an idle state by receiving only system information.

When data traffic for V2X is generated in the first UE 1f-01 (1f-20), RRC connection with the base station is performed (1f-25). The RRC connection may be performed before data traffic is generated (1f-20). The first UE 1f-01 requests the base station 1f-03 to provide a transmission resource for V2X communication with other UEs 1f-02 (1f-30). In this case, an RRC message or a MAC Control Element (CE) may be used to request the base station 1f-03 to provide the transmission resource. Here, SidelinkUEInformation or a UEAssistanceInformation message may be used as the RRC message. The MAC CE may be, for example, a buffer status report MAC CE of a new format (including at least an indicator indicating a buffer status report for V2X communication and information about a size of data buffered for sidelink communication) or the like. The base station 1f-03 allocates a V2X transmission resource to the first UE 1f-01 through a dedicated RRC message (1f-35).

The dedicated RRC message may be included in the RRCConnectionReconfiguration message. The allocated V2X resource may be a V2X resource allocated through Uu or a resource for PC5 according to the type of traffic requested by a UE or whether a corresponding link is congested. For the allocation of the V2X transmission resource, the UE additionally transmits ProSe Per Packet Priority (PPPP) and ProSe Per Packet Reliability (PPPR) or Logical Channel Identifier (LCID) information of V2X traffic through UEAssistanceInformation or MAC CE. Because information about resources used by other UEs are known to the base station 1f-03, the base station 1f-03 schedules a resource requested by the first UE 1f-01 among remaining resources. When configuration information of semi-persistent scheduling (SPS) through Uu is included in an RRC message, SPS may be activated by DCI transmission through a PDCCH (1f-40). The first UE 1f-01 selects a transmission link and a resource according to a resource allocated from the base station 1f-03 and a transmission method (1f-45), and transmits data to the UEs 1f-02 (1f-50).

Figure 7:
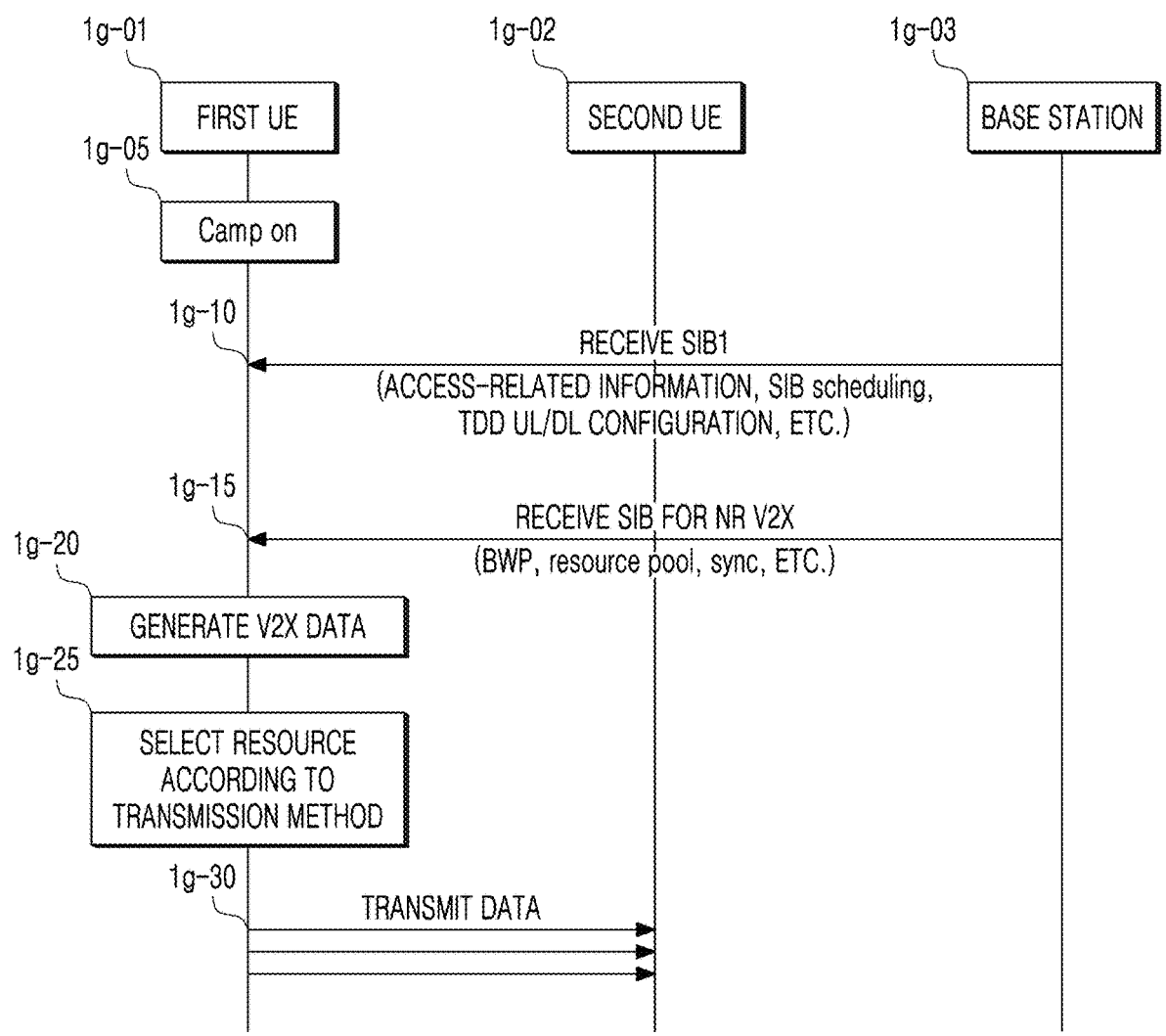
FIG. 7 is a diagram illustrating a data transmission procedure of an NR V2X UE operating in a UE autonomous resource selection mode (NR mode 2) in an NR system to which an embodiment of the disclosure is applied.

FIG. 7 is a diagram illustrating a data transmission procedure of an NR V2X UE operating in a UE autonomous resource selection mode (NR mode 2) in an NR system to which an embodiment of the disclosure is applied.

Referring to FIG. 7, unlike the base station scheduling mode in which the base station 1g-03 directly participates in resource allocation, in the UE autonomous resource selection mode (NR mode 2), a first UE 1g-01 may autonomously select a resource and transmits data, based on a resource pool received in advance through system information. In V2X communication, a base station 1g-03 allocates various types of sidelink resource pools (V2V resource pool and V2P resource pool) for the first UE 1g-01. Sidelink resource pools include a resource pool through which a UE may sense resources used by other adjacent UEs and autonomously select an available resource pool, and a resource pool through which a UE may randomly select a resource from among preset resource pools.

Referring to FIG. 7, the first UE 1g-01 camping on (1g-05) receives SIB1, which is basic information for accessing a corresponding serving cell, from a base station 1g-03 (1g-10) and thereafter receives system information for NR V2X (SIB for NR V2X) (1g-15). The SIB1 may include cell-access-related information, scheduling information of other system information, and TDD UL/DL configuration of the corresponding serving cell. The system information for NR V2X may include resource pool information for sidelink data transmission and reception, configuration information for a sensing operation, synchronization configuration information, inter-frequency transmission and reception, and the like. V2X-related system information should be provided from a base station and a cell that support V2X regardless of a request from a UE, because the UE should be operable even in the RRC connection state and an idle state by receiving only system information.

When data traffic for V2X is generated in the first UE 1g-01 (1g-15), the first UE 1g-01 selects a resource of a time/frequency domain from among resource pools received from the base station 1g-03 through system information according to a set transmission operation (e.g., dynamic allocation and a one-time transmission, dynamic allocation and multiple transmissions, sensing-based one-time transmission, sensing-based multiple transmissions, or random transmission) (1g-25), and transmits data to other UEs 1g-02 (1g-30). In general, because a V2X service is implemented for a purpose of periodic transmission of location information of a safety-related UE, in the NR mode 2, sensing-based multi-transmission is performed, i.e., a UE senses resources transmitted by other UEs, selects a resource block transmittable in a resource pool through which the transmission of the resources by the other UEs, and reserves future resources for periodic transmission. Thereafter, when a data packet generated in a UE changes or disappears, sensing and resource reservation operations are resumed or canceled so that a new data packet may be delivered. As described above, multi-transmission based on sensing and resource reservation may be operated by default, and when a sensing operation is not successfully performed, communication may be performed through random resource selection from a corresponding resource pool.

Figure 8:
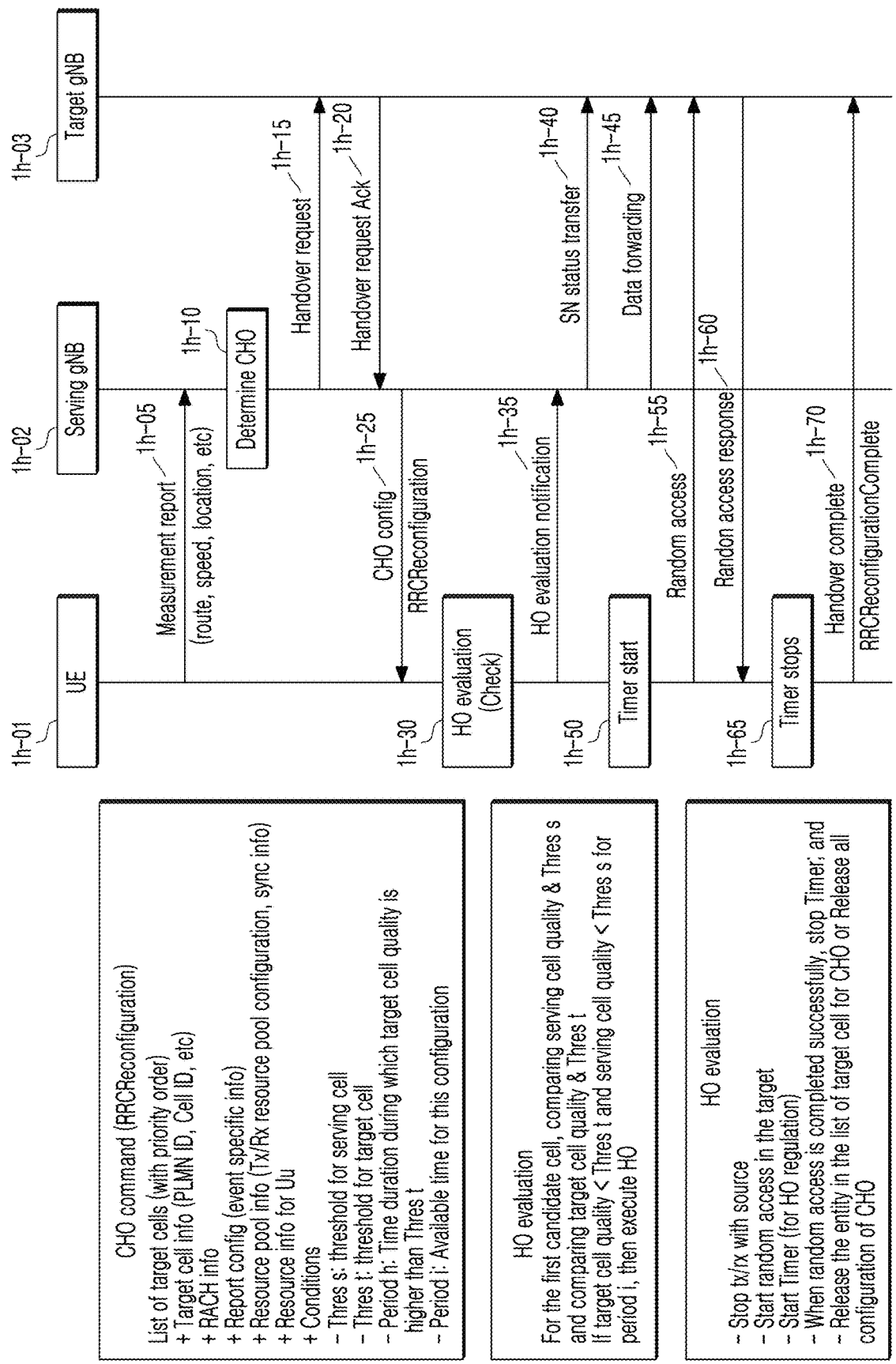
FIG. 8 is a diagram illustrating a procedure of performing a conditional handover from an NR serving cell to a target serving cell by an NR V2X UE that is in a connected state, according to an embodiment of the disclosure.

FIG. 8 is a diagram illustrating a procedure of performing a conditional handover from an NR serving cell to a target serving cell by an NR V2X UE that is in a connected state, according to an embodiment of the disclosure.

The performance of a radio link of a UE is highly likely to suddenly deteriorate in a next-generation mobile communication system using a beam, compared to an LTE system. In the next-generation mobile communication system, all directions are not supported but narrow areas are supported and thus beams are sensitive to mobility of a UE and a change of a channel. That is, when a UE is out of a current serving beam region, the serving cell may not be capable of completing a handover procedure through RRC signaling. In the case of a NR V2X UE, this problem may be more serious due to characteristics of the UE moving at high speeds and fast handover between serving cells may be continuously required. In order to solve this problem, it is necessary to transmit a handover command, which is to be transmitted from a serving cell to a UE, slightly earlier than a handover command in an LTE system. To this end, a method of setting a threshold, which is to be used for an event in which a UE transmits a measurement value, to be smaller than that used in the LTE system may be used, and the UE may perform a UE-based handover procedure, based on information included in the handover command received from the serving cell. The procedure will be described in detail below.

Referring to FIG. 8, a UE 1h-01 that is in the connected mode transmits a cell measurement report to a current serving eNB 1h-02 when a periodic or certain event is satisfied (1h-05). The serving eNB 1h-02 determines whether the UE 1h-01 is to perform a handover to an adjacent cell, based on the cell measurement report. The handover is an operation of changing a serving cell, which is to provide a service to a UE that is in the connected mode, to another base station. In this process, the base station determines whether to configure a general handover or a conditional handover, based on capability information of the UE 1h-01 as to whether to support conditional handover (CHO), conditional handover triggering conditions, etc. (1h-10). When the serving cell determines to perform a handover, the serving cell requests a new base station, i.e., a target eNB 1h-03, which is to provide a service to the UE 1h-01, to perform a handover by transmitting a handover (HO) request message to the target eNB 1h-03. When a target cell accepts the request to perform the handover, the target cell transmits a HO request ACK message to the serving cell (1h-20). The serving cell receiving the HO request ACK message transmits to the UE 1h-01 a CHO config message including CHO configuration information through an RRCReconfiguration message (1h-25). Before receiving the CHO config message, the UE 1h-01 transmits an uplink channel PUSCH/PUCCH while continuously receiving a downlink channel PDCCH/PDSCH/PHICH from the serving cell. A conditional handover configuration message includes the following information:

list of target cells sorted by priority: (the following settings are included as sub-settings of each target cell):
target cell information: expressed as PLMN ID, Cell ID, etc.
system information (V2X-related system information)
random-access-related information (time/frequency resource information for dedicated random access preamble transmission, a time period in which a RACH preamble is valid time after the reception of a HO command, etc.)
report configuration information (event-related information: event type, offset, cell specific offset, freq specific offset, etc.)
after handover, resource information for data transmission and reception through Uu channel (scheduling mode)
resource pool information for LTE/NR V2X transmission (transmitted/received resource pool setting, synchronization setting)
conditions for CHO triggering
Thres s: threshold for serving cell
Thres t: threshold for target cell
a period h in which target cell quality is higher than Thres t to determine handover
time duration during which CHO configuration is valid after reception of CHO handover configuration: after the time duration, a configuration received from a base station is not valid (may be included in an upper configuration)

When receiving a conditional handover configuration message, the UE 1h-01 performs a handover evaluation procedure (1h-30). A signal quality of a serving cell is compared with a threshold s, and a signal quality of a target cell is compared with a threshold t. When the signal qualities of the serving cell and the target cell satisfy the following specific conditions, a handover evaluation result is transmitted to the base station (1h-35). A Type 2 operation of performing handover to the target cell when the signal quality of the target cell is higher than the threshold t for the period h according to an embodiment of the disclosure will be described below. For reference, when a Type 1 operation occurs, the UE 1h-01 maintains connection with the serving cell. Alternatively, a handover evaluation of the serving cell may be triggered due to various events, and there may be one valid event in which the signal quality of the target cell has a value greater by a set offset value than a threshold (or is maintained to be greater than the threshold for the period h) as in an A3 event.

|  | Serving cell is good | Serving cell is bad |
|---|---|---|
| Target cell is good | HO to the target cell (Type 2) | HO to the target cell (Type 2) |
| Target cell is bad | Stay in the serving cell (Type 1) | Transition to the inactive/idle state (Type 3) |

When the UE 1h-01 notifies the handover evaluation with respect to the Type 2 operation, the serving cell transmits a sequence number (SN) status for uplink/downlink data and transmits downlink data to the target cell when there is the downlink data (1h-40 and 1h-45). When the UE 1h-01 determines handover to the target cell, data transmission/reception with the serving cell is stopped and a timer is started (1h-50). The timer causes the UE 1h-01 to return to an original configuration and to change to an RRC idle state or an inactive state, when the UE 1h-01 does not succeed in performing the handover to the target cell for a certain time. The UE 1h-01 attempts random access to a target cell indicated by the serving cell (or a certain target cell that satisfies the CHO triggering condition among indicated target cells) (1h-55). The random access is performed to inform the target cell of movement of the UE 1h-01 and to synchronize with an uplink through the handover. For the random access, the UE 1h-01 transmits to the target cell a preamble IE provided from the serving cell or a preamble corresponding to randomly selected preamble ID. After the preamble is transmitted, the UE 1h-01 monitors whether a RAR message is transmitted from the target cell after a certain number of subframes. A time period in which the monitoring is performed is referred to as a RAR window. When a RAR is received within a certain time (1h-60), the UE 1h-01 transmits a HO complete message in an RRCConnectionReconfigurationComplete message to the target cell (1h-70). Thereafter, the UE 1h-01 transmits an uplink channel PUSCH/PUCCH while continuously receiving a downlink channel PDCCH/PDSCH/PHICH from the target cell. As described above, when the RAR is successfully received from the target cell, the UE 1h-01 ends the timer (1h-65). Thereafter, the target cell requests an AMF and a CN to perform path modification so as to correct paths of bearers set as the serving cell, and notifies the serving cell to delete UE context of the UE 1h-01. Accordingly, the UE 1h-01 attempts to receive data from the start of the RAR window for the target cell, and starts transmission of the data to the target cell while transmitting the RRCConnectionReconfigurationComplete message after the RAR is received.

However, V2X is seriously affected by a problem that data transmission and reception according to the above-described handover procedure cannot be performed for an interruption time period (a time period until connection to the previous serving cell 1h-02 is canceled and data can be transmitted to or received from the target cell 1h-03), and thus, a procedure for preventing this problem is needed. CHO config information includes LTE/NR V2X-related resource pool information, and the CHO config message includes information about an exceptional resource pool available in the target cell 1h-03. When the UE 1h-01 performs a handover to the target cell 1h-03 because a CHO is satisfied during performing of V2X communication through a resource pool of the previous serving cell 1h-02, the UE 1h-01 may perform V2X communication using an exceptional resource of the target cell until a V2X packet can be transmitted through a transmission resource pool of the target cell 1h-03.

After completing a CHO process with respect to the target cell 1h-03, the UE 1h-01 deletes information about the target cell 1h-03 for which handover has been completed from a CHO configuration information list received in operation 1h-25 or releases all CHO configuration information, after operation 1h-70.

Figure 9:
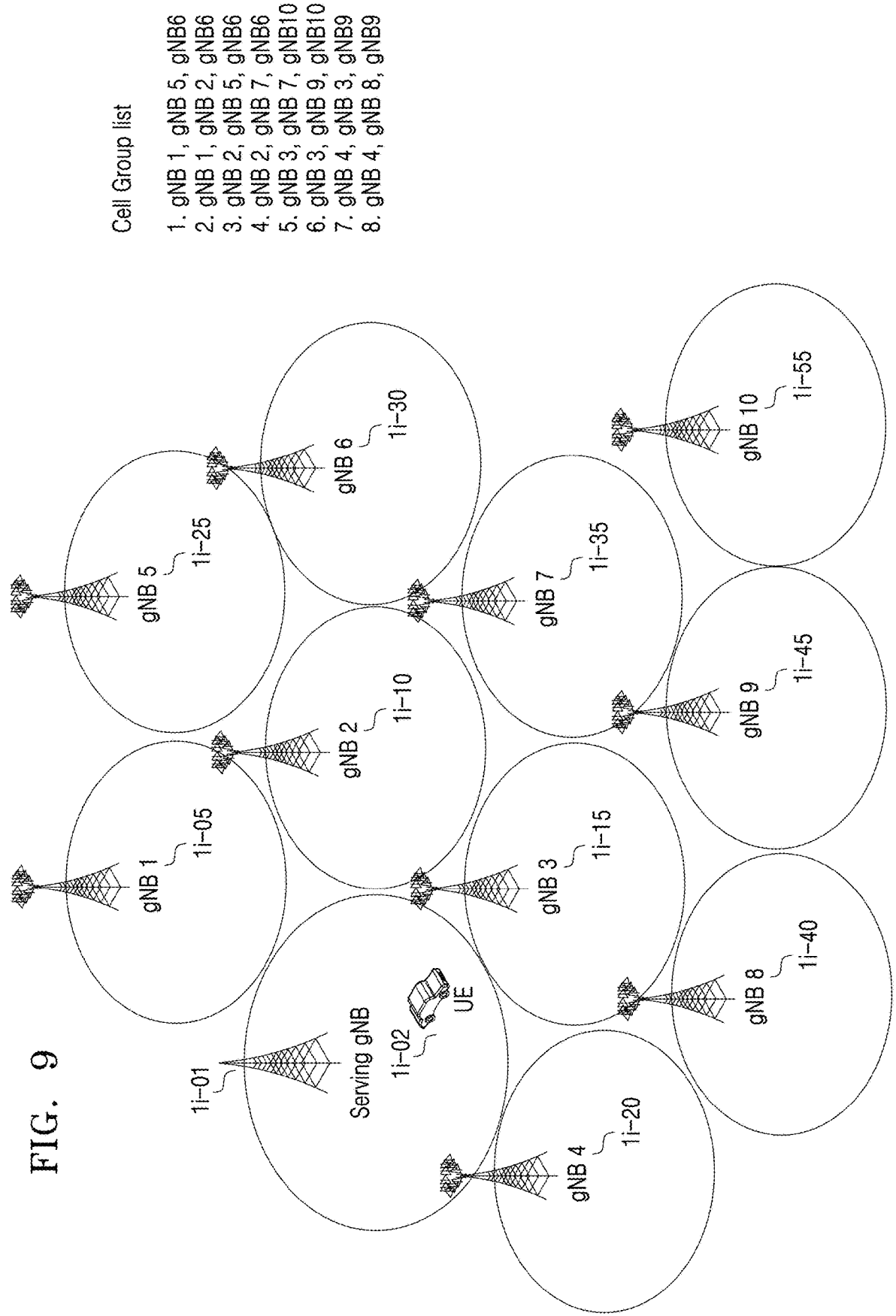
FIG. 9 is a diagram illustrating a scenario, to which an embodiment of the disclosure is applied, for describing a conditional handover process in which a plurality of target cells for NR V2X are configured as a group.

FIG. 9 is a diagram illustrating a scenario, to which an embodiment of the disclosure is applied, for describing a CHO procedure in which a plurality of target cells for NR V2X are configured as a group.

As described above, according to conditions required by NR V2X, a UE that requires a high data rate and moves at high speeds should be capable of performing V2X communication and thus frequent handovers may be caused. In addition, in the case of an NR V2X UE, entertainment may be requested in a vehicle. Entertainment in a vehicle, as used below, is defined as in-vehicle entertainment (IVE): high data rate support for high speed vehicle is required. Because an IVE UE moves on the road, the IVE UE moves on a route in a network, and mobility, such as a moving path and speed of the IVE UE is predictable in many cases. This is particularly true on a highway or a road equivalent thereto, and information regarding mobility may be obtained from a network server through a vehicle movement assistance device such as a navigation system or a GPS.

In an embodiment of the disclosure, multi-hop conditional handover may be supported and thus a scenario for providing a seamless handover environment during high-speed data transmission/reception may be performed.

Referring to FIG. 9, it is assumed that a UE 1i-02 is currently performing V2X communication in a connected state in an NR base station 1i-01 and then a plurality of target cells are set as a group for conditional handover. A plurality of target cells may be sequentially included in a list of conditional handover target cells, which are provided by the base station, according to priority. For example, as shown in FIG. 9, when eight groups are provided in a target cell list for conditional handover and three target cells are sequentially included in each of the groups, the UE 1i-02 compares CHO conditions with respect to first target cells in the groups in the list according to priority and performs CHO. The list is maintained even after performing conditional handover with respect to a target cell, and the UE 1i-02 deletes ID of the target cell for which handover is completed from the list. Thereafter, when there is no new configuration information from a base station, a CHO condition search and CHO may be performed using a preset CHO configuration list, and the base station may add CHO information for an $(N+1)^{th}$ new cell after a CHO operation is performed. In an embodiment of the disclosure, the UE 1i-02 may check the CHO condition for a gNB1 that ranks first in a CHO target cell group list, and perform CHO for a corresponding target cell when the CHO condition is met. Thereafter, a CHO check may performed for effective lists 1 and 2 according to priority, and CHO may be performed by a gNB5 or a gNB2. In this case, the gNB5 is considered prior to the gNB2. At this stage, the base station may provide an additional gNB ID, which may be added to the back of a current list. A gNB ID may be set differently for the lists 1 and 2. A set multi-hop CHO configuration information may be valid for a set valid time provided together and be canceled after the set valid time is over. That is, a basic handover operation may be performed after a CHO configuration expires or CHO may be performed after a new CHO configuration is received. When it is determined that set multi-hop CHO configuration information is no longer valid, the base station may update the multi-hop CHO configuration information through RRC reconfiguration.

Figure 10:
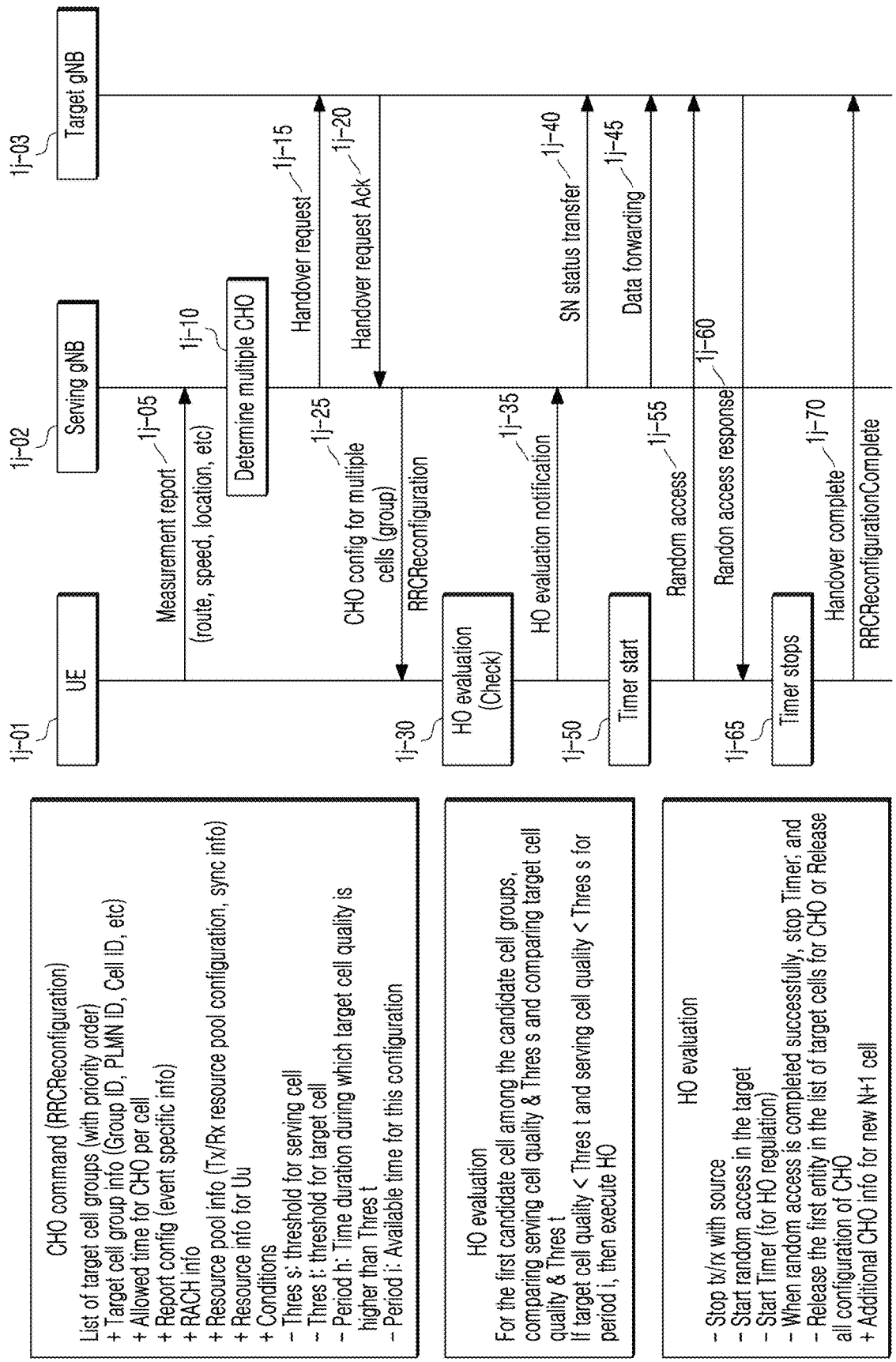
FIG. 10 is a diagram illustrating a procedure of performing a multi-hop conditional handover from an NR serving cell to a target serving cell by an NR V2X UE in a connected state, according to an embodiment of the disclosure.

FIG. 10 is a diagram illustrating a procedure of performing a multi-hop conditional handover from an NR serving cell to a target serving cell by an NR V2X UE in a connected state, according to an embodiment of the disclosure.

A UE 1j-01 that is in the connected mode transmits a cell measurement report to a current serving eNB 1j-02 when a periodic or certain event is satisfied (1j-05). The serving gNB s1j-02 determines whether or not the UE 1j-01 is to perform a multi-hop conditional handover to an adjacent cell, based on the cell measurement report. Multi-hop conditional handover has been described above with reference to FIG. 9. In the above description with reference to FIG. 9, a base station determines whether to configure a general handover or multi-hop conditional handover, based on capability information of a UE as to whether multi-hop CHO is to be supported, multi-hop CHO triggering condition, etc. (1j-10). When a serving cell determines to perform a handover, the serving cell requests a new base station, i.e., a target eNB 1j-03, which is to provide a service to the UE 1j-01, to perform a handover by transmitting a handover (HO) request message to the target eNB 1j-03. When a target cell accepts the request to perform the handover, the target cell transmits a HO request ACK message to the serving cell (1j-20). Operations 1j-15 and 1j-20 may be performed by the serving cell together with a plurality of target cells. The serving cell receiving the HO request ACK message transmits to the UE 1j-01 a CHO config message including the multi-hop CHO configuration information through an RRCReconfiguration message (1j-25). Before receiving the CHO config message, the UE 1j-01 transmits an uplink channel PUSCH/PUCCH while continuously receiving a downlink channel PDCCH/PDSCH/PHICH from the serving cell. A CHO configuration message includes the following information:

list of target cell groups sorted by priority:
    target cell list: sequentially includes target cell IDs, and includes the number of pieces of target cell information (PLMIN ID, cell ID, etc. of each target cell) set by a base station (the following configurations are included as sub-configurations of each target cell)
    system information (V2X-related system information)
    random-access-related information (time/frequency resource information for dedicated random access preamble transmission, a duration during which a RACH preamble is valid time after the reception of a HO command, etc.)
    report configuration information (event-related information: event type, offset, cell specific offset, freq specific offset, etc.)
    after handover, resource information for data transmission and reception through Uu channel (scheduling mode)
    resource pool information for LTE/NR V2X transmission (transmitted/received resource pool setting, synchronization setting)
    conditions for CHO triggering
    Thres s: threshold for serving cell
    Thres t: threshold for target cell
    period h in which target cell quality is higher than Thres t to determine handover
    time duration during which CHO configuration is valid after reception of CHO handover configuration: after the time duration, a configuration received from a base station is not valid (may be included in an upper configuration (for each target cell or cell group))

When receiving a CHO configuration message, the UE 1j-01 performs a handover evaluation procedure (1j-30). A signal quality of a serving cell is compared with a threshold s, and a signal quality of a target cell is compared with a threshold t. When the signal qualities of the serving cell and the target cell satisfy the following specific conditions, a handover evaluation result is transmitted to the serving gNB 1h-02 (1j-35). A Type 2 operation of performing handover to the target cell when the signal quality of the target cell is higher than the threshold t for the period h according to an embodiment of the disclosure will be described below. For reference, when a Type 1 operation occurs, the UE 1h-01 maintains connection with the serving cell. Alternatively, a handover evaluation of the serving cell may be triggered due to various events, and there may be one valid event in which the signal quality of the target cell has a value greater by a set offset value than a threshold (or is maintained to be greater than the threshold during the period h) as in an A3 event.

|  | Serving cell is good | Serving cell is bad |
|---|---|---|
| Target cell is good | HO to the target cell (Type 2) | HO to the target cell (Type 2) |
| Target cell is bad | Stay in the serving cell (Type 1) | Transition to the inactive/idle state (Type 3) |

When the UE 1h-01 notifies the handover evaluation with respect to the Type 2 operation, the serving cell transmits an SN status for uplink/downlink data and transmits downlink data to the target cell when there is the downlink data (1j-40 and 1j-45). When the UE 1j-01 determines handover to the target cell, data transmission/reception with the serving cell is stopped and a timer is started (1j-50). The timer causes the UE 1j-01 to return to an original configuration and to change to an RRC idle state or an inactive state, when the UE 1j-01 does not succeed in performing the handover to the target cell for a certain time. The UE 1j-01 attempts random access to a target cell indicated by the serving cell (a target cell determined according to priority and included in a multi-hop CHO list) (1j-55). The random access is performed to inform the target cell of movement of the UE 1j-01 and to synchronize with an uplink through the handover. For the random access, the UE 1j-01 transmits to the target cell a preamble ID provided from the serving cell or a preamble corresponding to a randomly selected preamble ID. After the preamble is transmitted, the UE 1j-01 monitors whether a RAR message is transmitted from the target cell after a certain number of subframes. A time period in which the monitoring is performed is referred to as a RAR window. When a RAR is received within a certain time (1j-60), the UE 1j-01 transmits a HO complete message in an RRCConnectionReconfigurationComplete message to the target cell (1j-70). Thereafter, the UE 1j-01 transmits an uplink channel PUSCH/PUCCH while continuously receiving a downlink channel PDCCH/PDSCH/PHICH from the target cell. As described above, when the RAR is successfully received from the target cell, the UE 1j-01 ends the timer (1j-65). Thereafter, the target cell requests an AMF and a CN to perform path modification so as to correct paths of bearers set as the serving cell, and notifies the serving cell to delete UE context of the UE 1j-01. Accordingly, the UE 1j-01 attempts to receive data from the start of the RAR window for the target cell, and starts transmission of the data to the target cell while transmitting the RRCConnectionReconfigurationComplete message after the RAR is received.

However, V2X is seriously affected by a problem that data transmission and reception according to the above-described handover procedure cannot be performed for an interruption time period (a time period until connection to the previous serving cell 1j-02 is canceled and data can be transmitted to or received from the target cell 1j-03), and thus, a procedure for preventing this problem is needed. CHO config information includes LTE/NR V2X-related resource pool information, and the CHO config message includes information about an exceptional resource pool available in the target cell 1j-03. When the UE 1j-01 performs a handover to the target cell 1j-03 because a CHO is satisfied during performing of V2X communication through a resource pool of the previous serving cell 1j-02, the UE 1h-01 may perform V2X communication using an exceptional resource of the target cell 1j-03 until a V2X packet can be transmitted through a transmission resource pool of the target cell 1j-03.

After completing a CHO process to the target cell 1j-03, the UE 1j-01 may update the multi-hop CHO configuration information received in operation 1j-25 after operation 1j-70. For example, the UE 1j-01 may delete information about a target cell for which handover has been completed from a target cell list and maintain CHO configuration information for a list of target cells in remaining consecutive hops. A set multi-hop CHO configuration information may be valid for a set valid time provided together and be canceled after the set valid time is over. That is, a basic handover operation may be performed after a CHO configuration expires or CHO may be performed after a new CHO configuration is received. When it is determined that set multi-hop CHO configuration information is no longer valid, the base station may update the multi-hop CHO configuration information through RRC reconfiguration.

Figure 11:
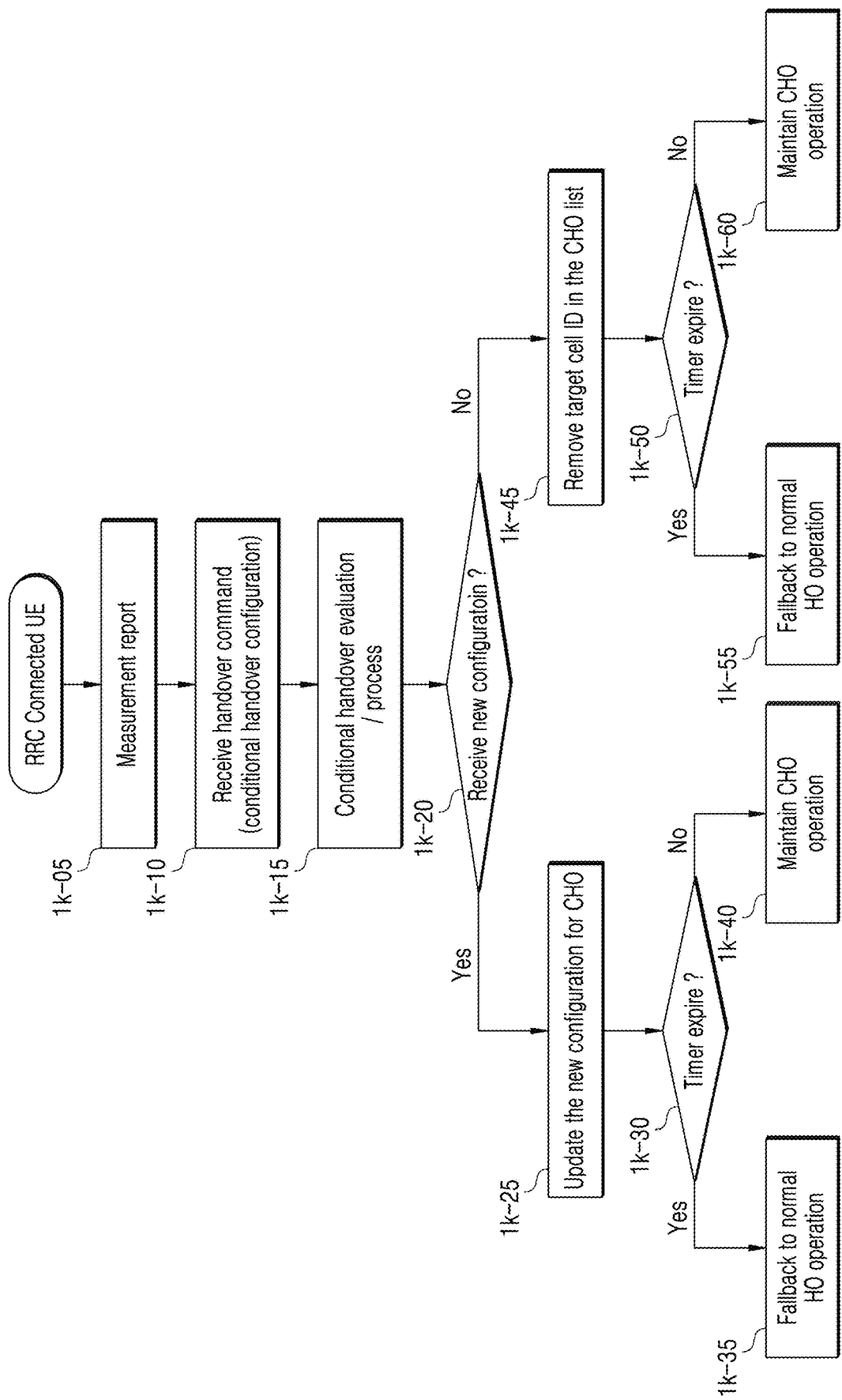
FIG. 11 is a diagram illustrating an operation of a UE, according to an embodiment of the disclosure.

FIG. 11 is a diagram illustrating an operation of a UE according to an embodiment of the disclosure.

In operation 1k-05, an NR V2X UE in the connected state performs measurement with respect to a current serving cell and neighboring cells according to UE mobility, and reports a measurement result to a base station when a certain condition is satisfied. The measurement result reported by the UE and a triggering condition in operation 1k-05 may be predetermined, and the reporting may be performed periodically or according to a threshold. In operation 1k-10, the UE may receive a handover command from a serving base station. In this case, the handover command may be a CHO command or a multi-hop CHO command. Before receiving the handover command, the UE may share information regarding capability for supporting the handover command with a serving cell that is in the connected state, and the base station may determine conditional handover, based on the information. Contents of the CHO command or the multi-hop CHO command are as described above with reference to FIGS. 8 and 9.

In operation 1k-15, when the UE evaluates and executes a CHO or a multi-hop CHO, UE-centered handover may be performed with respect to a target cell, according to a set condition. When in operation 1k-20, the UE receives a new handover command from the base station after performing handover to the target cell, the UE updates a stored CHO or multi-hop CHO in operation 1k-25. When a new handover command is not received from a connected serving cell information excluding previous cell information is applied to CHO or multi-hop CHO information received from a previous serving cell in operation 1k-45. This means that the previous cell information may be released by an operation of the UE while the handover is performed/completed. In a handover update process, the base station may provide only information about an (N+1)$^{th}$ new cell, and in this case, the UE adds the information about the (N+1)$^{th}$ new cell to a list to which an existing CHO is applied. Thereafter, the CHO or multi-hop CHO is ended and an existing handover procedure is followed (1k-35 or 1k-55) when a timer to which CHO is applied and which is received from the CHO or multi-hop CHO command expires (1k-30 or 1k-50), and is maintained while the timer is maintained (1k-40 or 1k-60).

Figure 12:
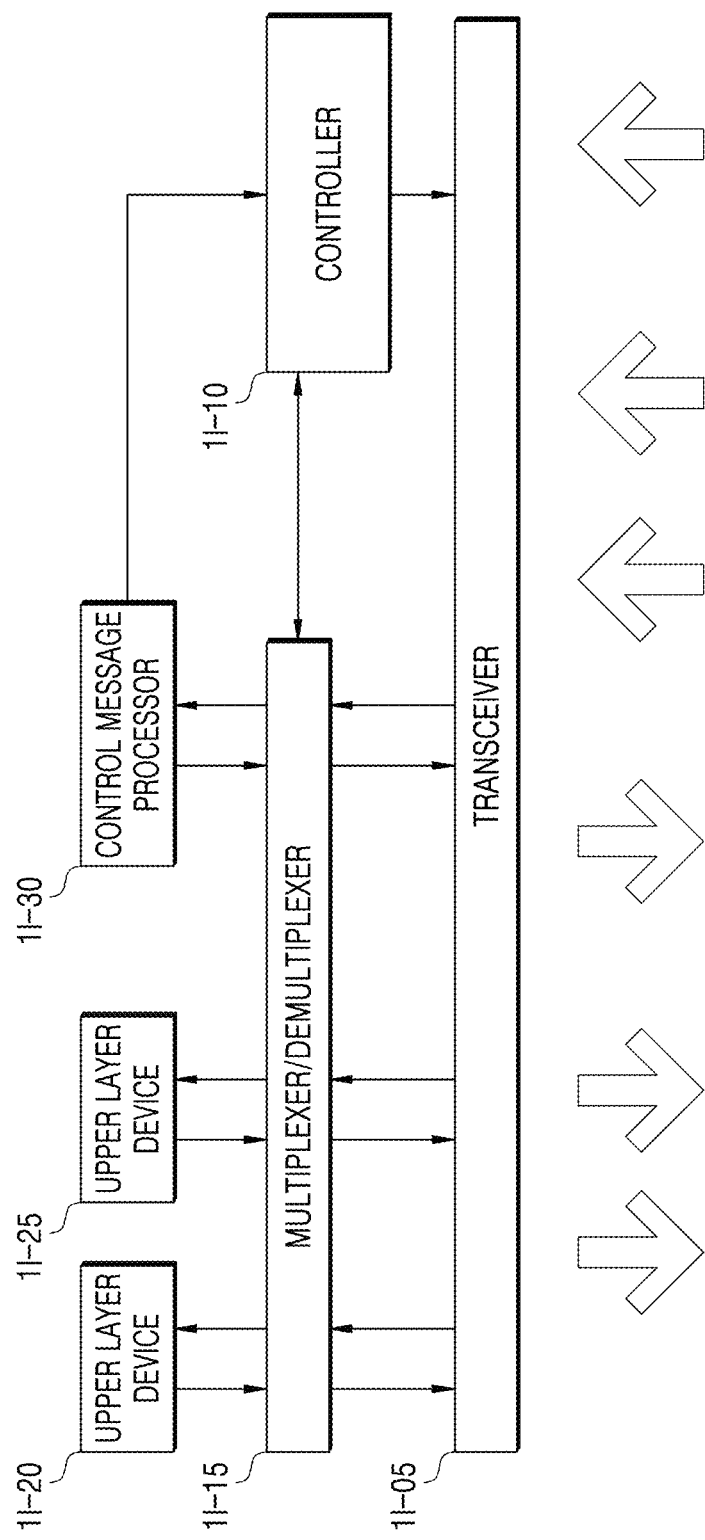
FIG. 12 is a block diagram illustrating a configuration of a UE according to an embodiment of the disclosure.

FIG. 12 is a block diagram illustrating a configuration of a UE according to an embodiment of the disclosure.

Referring to FIG. 12, the UE according to an embodiment of the disclosure includes a transceiver 1l-05, a controller 1l-10, a multiplexer/demultiplexer 1l-15, and various upper layer processors 1l-20 and 1l-25, and a control message processor 1l-30.

The transceiver 1l-05 receives data and a certain control signal through a forward channel of a serving cell, and transmits data and a certain control signal through a reverse channel. When multiple serving cells are configured, the transceivers 1l-05 transmits or receives data and a control signal through the multiple serving cells.

The multiplexer/demultiplexer 1l-15 multiplexes data generated by the upper layer processors 1l-20 and 1l-25 or the control message processor 1l-30 or demultiplexes data received from the transceiver 1l-05, and transmits resultant data to a corresponding upper layer processor 1l-20 or 1l-25 or the control message processor 1l-30.

The control message processor 1l-30 performs a necessary operation by transmitting or receiving a control message from a base station. Here, the necessary operation includes a function of processing the control message such as an RRC message and an MAC CE, reporting a CBR measurement value, and receiving an RRC messages with respect to a resource pool and an operation of the UE.

The upper layer processors 1l-20 and 1l-25 refer to DRB entities and may be configured for each service. Data generated from a user service such as File Transfer Protocol (FTP) or Voice over Internet Protocol (VoIP) is processed and transmitted to the multiplexer/demultiplexer 1l-15 or data transmitted from the multiplexer/demultiplexer 1l-15 is processed and transmitted to a higher-layer service application.

The controller 1l-10 controls the transceiver 1l-05 and the multiplexer/demultiplexer 1l-15 to check a scheduling command, e.g., reverse grants, received through the transceiver 1l-05 and perform reverse transmission at an appropriate time by using an appropriate transmission resource. Although it is described above with reference to FIG. 12 that the UE includes a plurality of blocks and the plurality of blocks perform different functions, the above description is intended to provide only an embodiment of the disclosure and embodiments of the disclosure are not limited thereto. For example, the function performed by the demultiplexer 1l-15 may be performed by the controller 1l-10.

Figure 13:
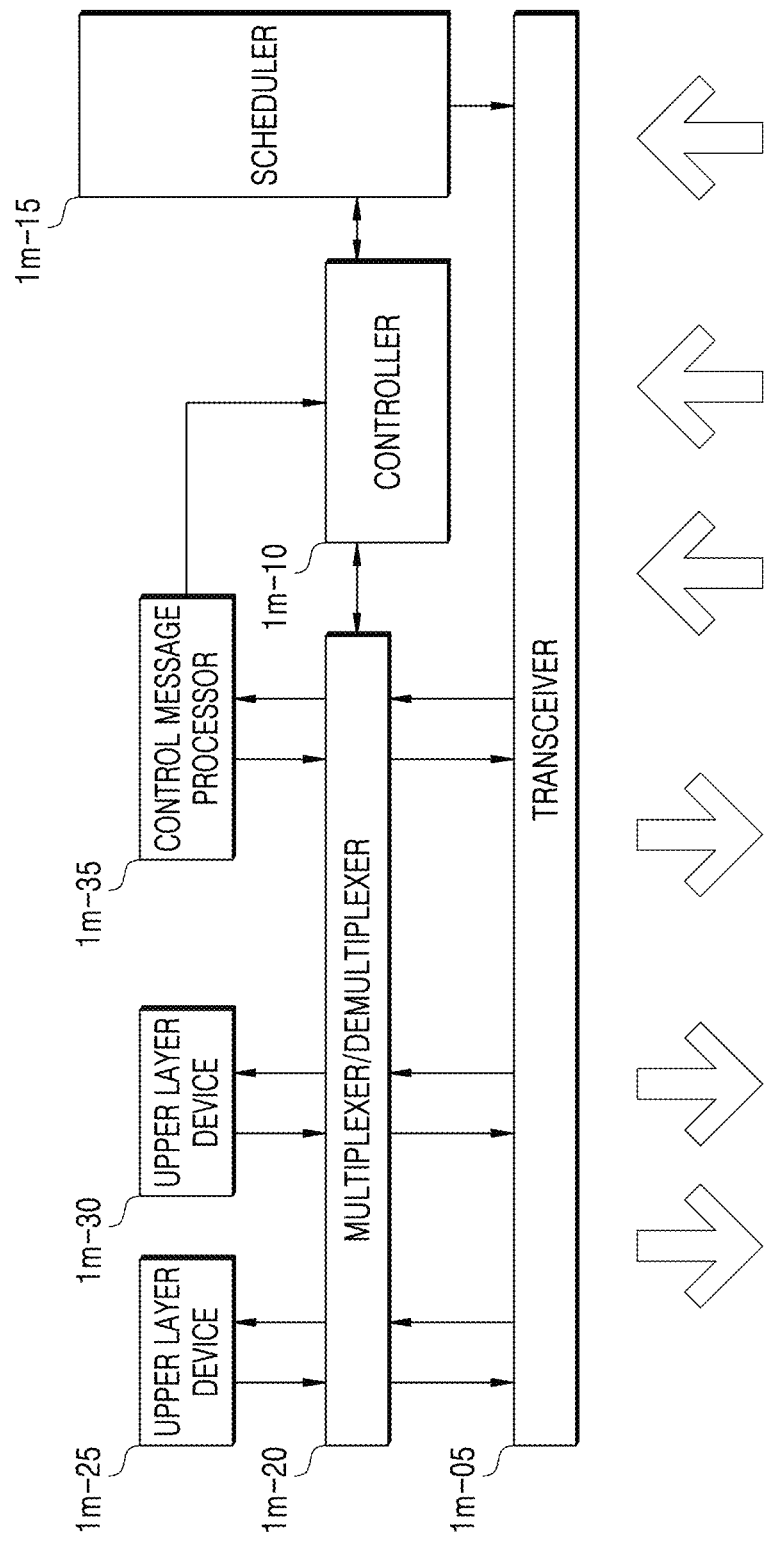
FIG. 13 is a block diagram illustrating a configuration of a base station according to an embodiment of the disclosure.

FIG. 13 is a block diagram illustrating a configuration of a base station according to an embodiment of the disclosure.

Referring to FIG. 13, the base station according to an embodiment of the disclosure includes a transceiver 1m-05, a controller 1m-10, a multiplexer/demultiplexer 1m-20, a control message processor 1m-35, and various upper layer processors 1m-25 and 1m-30, and a scheduler 1m-15.

The transceiver 1m-05 transmits data and a certain control signal through a forward carrier and receives data and a certain control signal through a reverse carrier. When multiple carriers are configured, the transceivers 1m-05 transmits or receives data and a control signal through the multiple carriers.

The multiplexer/demultiplexer 1m-15 multiplexes data generated by the upper layer processors 1m-25 and 1m-30 or the control message processor 1m-35 or demultiplexes data received from the transceiver 1m-05, and transmits resultant data to a corresponding upper layer processor 1m-25 or 1m-30, the control message processor 1m-35 or the controller 1m-10.

The control message processor 1m-35 generates a message to be transmitted to a UE and transmits the message to a lower layer according to a command from the controller 1m-10.

The upper layer processors 1m-25 and 1m-30 may be configured for each UE or each service, and process data generated from a user service such as FTP or VOIP and transmit the data to the multiplexer/demultiplexer 1m-20 or process data transmitted from the multiplexer/demultiplexer 1m-20 and transmits the data to a higher layer service application. The scheduler 1m-15 allocates a transmission resource to a UE at an appropriate time in consideration of a buffer status of the UE, a channel status, an active time of the UE, etc., processes a signal transmitted to the transceiver 1m-05 from the UE or processes a signal to be transmitted to the UE.

According to an embodiment of the disclosure, when an inter-cell handover is performed for an NR V2X UE, the NR V2X UE may perform a handover according to conditions, based on already set information, and thus, a handover procedure may be simplified, a high data rate to be considered in the NR system may be supported, and mobility may be efficiently supported according to high-speed movement.

In the disclosure, a method of processing a MAC CE in consideration of autonomous packet duplication transmission will be described.

Figure 14:
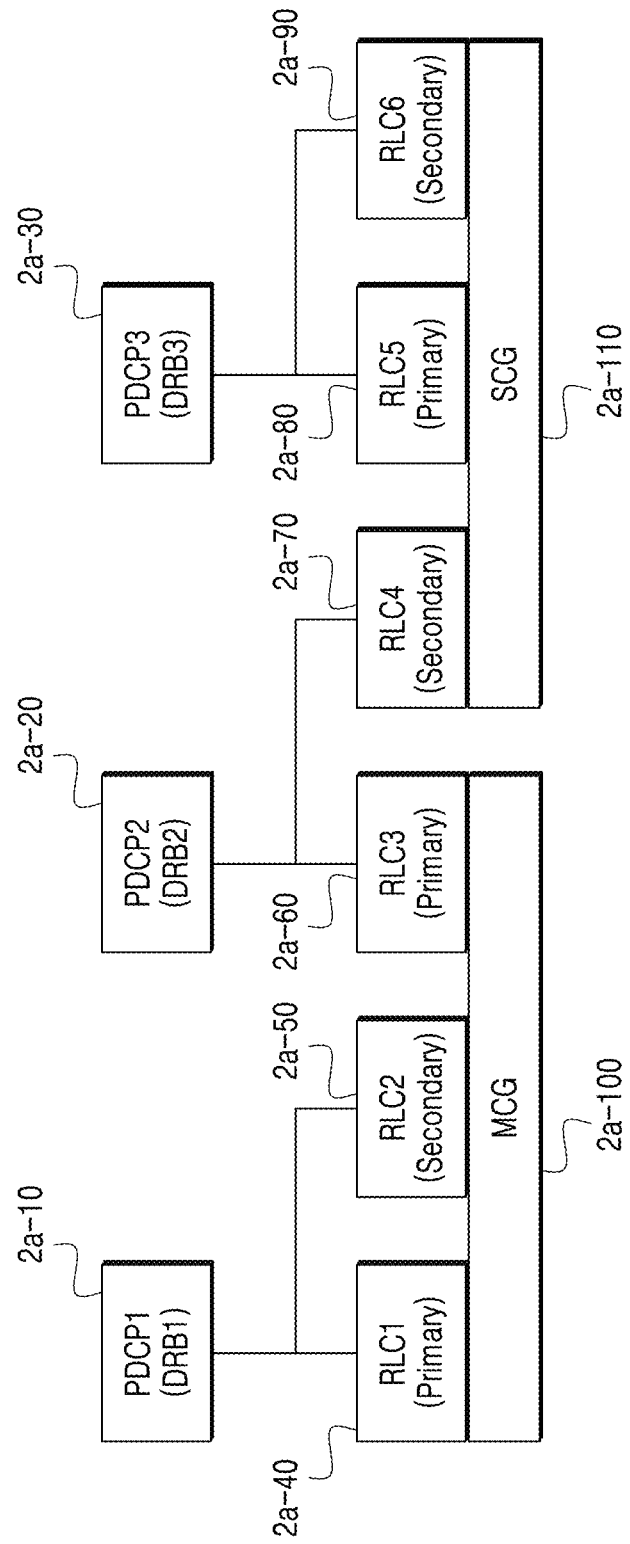
FIG. 14 is a diagram illustrating a structure of a radio bearer for which packet duplication transmission is configured, according to an embodiment of the disclosure.

FIG. 14 is a diagram illustrating a structure of a radio bearer for which packet duplication transmission is configured, according to an embodiment of the disclosure.

Packet duplication transmission refers to duplicating, by a transmitter, a packet and transmitting duplicated packet in multiple paths.

Referring to FIG. 14, it is assumed that three DRBs, i.e., a first DRB 2a-10, a second DRB 2a-20, and a third DRB 2a-30, are configured and each of them may correspond to one PDCP entity. Packet duplication transmission is performed by duplicating one packet at a PDCP layer of a transmitter and transferring duplicated packet to different RLC entities. To this end, two or more RLC entities corresponding to one PDCP are necessary for a DRB in which packet duplication transmission is configured.

In an embodiment of the disclosure, a first PDCP 2a-10 is connected to a first RLC 2a-40 and a second RLC 2a-50, a second PDCP 2a-20 is connected to a third RLC 2a-60 and a fourth RLC 2a-70, and a third PDCP3 2a-30 is connected to a fifth RLC 2a-80 and a sixth RLC 2a-90. RLC entities connected to one PDCP entity may be classified into a primary RLC entity and a secondary RLC entity. The primary RLC entity is an RLC entity that performs packet transmission at the PDCP layer of the transmitter regardless of whether packet duplication is activated, and the secondary RLC entity performs packet transmission at the PDCP layer of the transmitter only when packet duplication is activated.

In an embodiment of the disclosure, it is assumed that a primary RLC of the first DRB 2a-10 is the first RLC 2a-40, a primary RLC of the second DRB 2a-20 is the third RLC 2a-60, and a primary RLC of the third DRB 2a-30 is the fifth RLC 2a-80.

Packet duplication transmission may be also configured in a dual connectivity or multi-connectivity structure in which a UE is connected to two base stations, and in this case, a DRB in which packet duplication is configured may be configured. In this case, connection to each base station may be identified according to a cell group (CG).

In FIG. 14, a dual connectivity structure is assumed, and a master cell group (MCG) 2a-100 that assumes connection to a master base station and a secondary cell group (SCG) 2a-110 that assumes connection to a secondary base station are configured. In FIG. 14, all RLC entities connected to the first DRB are connected to the MCG 2a-100, which means that packet duplication transmission performed by the first DRB is performed by the MCG 2a-100. In this case, a list of cells available to each RLC entity may be previously designated and each RLC entity transmits data only to the cells of the list. Among RLC entities connected to the second DRB 2a-20, a third RLC is connected to the MCG 2a-100 and a fourth RLC is connected to the SCG 2a-110 and thus packet duplication transmission performed by the second DRB 2a-20 is performed by both the MCG 2a-100 and the SCG 2a-110. All RLC entities connected to the third DRB 2a-30 are connected to the SCG 2a-110, which means that packet duplication transmission performed by the third DRB 2a-30 is performed by the SCG 2a-110. In this case, a list of cells available to each RLC entity may be previously specified and each RLC entity transmits data only to the cells of the list.

DRBs in which packet duplication transmission is configured may be largely classified according to a dual connectivity (DC) type packet duplication method and a carrier aggregation (CA) type packet duplication method. It is assumed that for dual connectivity type packet duplication, packet transmission is performed in a bearer, e.g., the second DRB 2a-20, in which RLC entities are connected to different cell groups. It is assumed that for carrier aggregation type packet duplication, all RLC entities are connected to the same cell group as in the first DRB 2a-10 and the third DRB 2a-30 and a list of cells available to each RLC entity is specified in advance.

Figure 15:
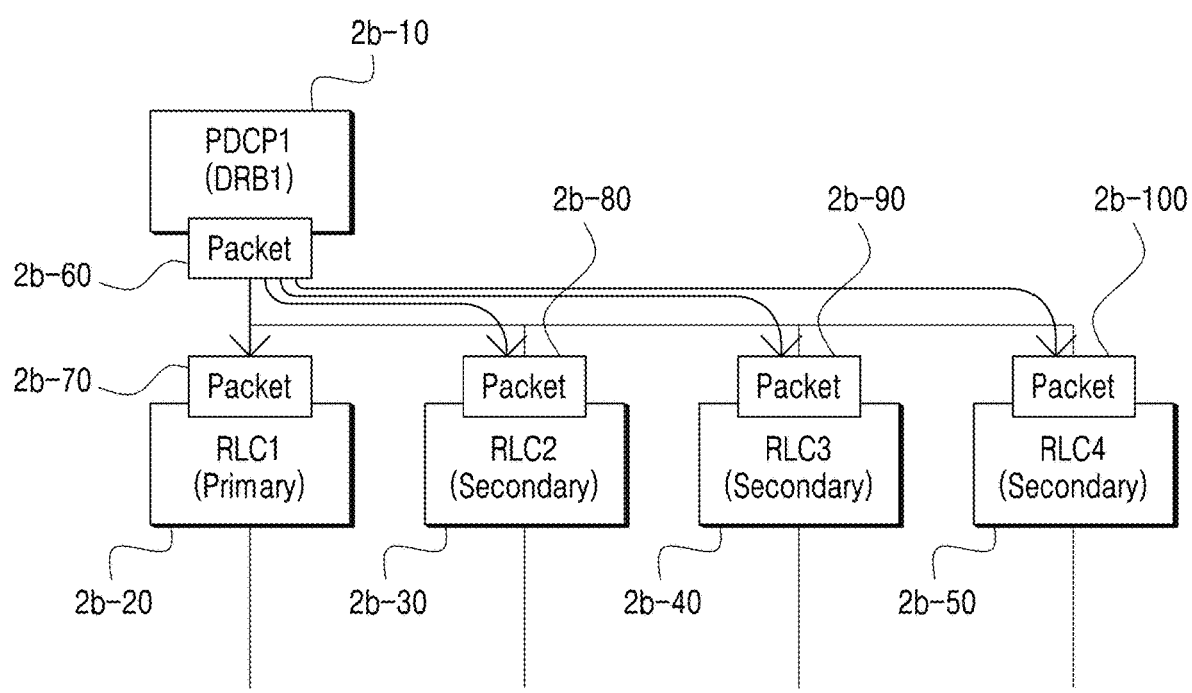
FIG. 15 is a diagram illustrating a method of performing packet duplication transmission in a radio bearer for which packet duplication transmission is configured, according to an embodiment of the disclosure.

FIG. 15 is a diagram illustrating a method of performing packet duplication transmission in a radio bearer for which packet duplication transmission is configured, according to an embodiment of the disclosure.

Packet duplication transmission refers to duplicating, by a transmitter, a packet and transmitting duplicated packet in multiple paths. Referring to FIG. 15, in a radio bearer structure, a total of four RLC entities, i.e., a first RLC 2b-20, a second RLC 2b-30, a third RLC 2b-40, and a fourth RLC 2b-50, are connected to one PDCP entity 2b-10 so as to support multiple paths. However, the number of RLC entities to be connected to one PDCP entity need not be limited to a specific case and may be set by a base station according to a radio link and a network structure. In this case, a layer for duplicating a packet may be a PDCP layer 2b-10, and the packet may be duplicated at the PDCP layer 2b-10 and duplicated the packet may be transmitted to two or more different RLC entities, thereby performing independent packet transmission. Because one radio bearer has one PDCP entity regardless of packet duplication, a PDCP entity may correspond to one radio bearer ID.

In FIG. 15, it is assumed that a radio bearer including the first PDCP 2b-10 is a DRB but may be a signaling radio bearer (SRB). RLC entities may be classified into a primary RLC entity 2b-20 and secondary RLC entities 2b-30, 2b-40, and 2b-50 according to a purpose. A primary RLC entity is an entity that always transmits packets regardless of activation of packet duplication. A secondary RLC entity is an entity that transmits packets only when packet duplication is activated. In addition, the secondary RLC entity may not participate in uplink packet transmission according to a configuration method thereof. When a split bearer is applied, a packet may be transmitted only to the primary RLC entity when data to be transmitted by a transmitter is less than or equal to (or is less than) a certain threshold, and may be transmitted to both the primary and secondary entities when the data is greater than (or is greater than or equal to) the threshold. The operations described above may be included in at least one of a radio bearer configuration, an RLC bearer configuration, a PDCP configuration, or an RLC configuration of an RRC configuration message, and transmitted to a UE.

Referring to FIG. 15, in an embodiment of the disclosure, when packet duplication transmission is configured and activated, the transmission PDCP entity 2b-10 duplicates a packet 2b-60 and transmits packets 2b-70, 2b-80, 2b-90, and 2b-100 duplicated from the packet 2b-60 to all the RLC entities 2*b*-20, 2*b*-30, 2*b*-40, and 2*b*-50. In this case, each of these RLC entities may operate in an independent mode. When each of the RLC entities operates in an RLC ACK mode (AM), each of the RLC entities may independently perform an ARQ operation.

As illustrated in FIG. 15, when four RLC entities 2*b*-20, 2*b*-30, 2*b*-40, and 2*b*-50 are set in a radio bearer, the transmission PDCP entity 2*b*-10 may duplicate one packet into a total of four identical packets and transmit the four identical packets to four RLC entities 2*b*-20, 2*b*-30, 2*b*-40, and 2*b*-50.

However, in another embodiment of the disclosure, it is not necessary to perform packet duplication transmission with respect to all configured RLC entities. In this case, in order to directly perform packet duplication transmission, duplicated packets may be transmitted only to a set RLC entity.

Figure 16:
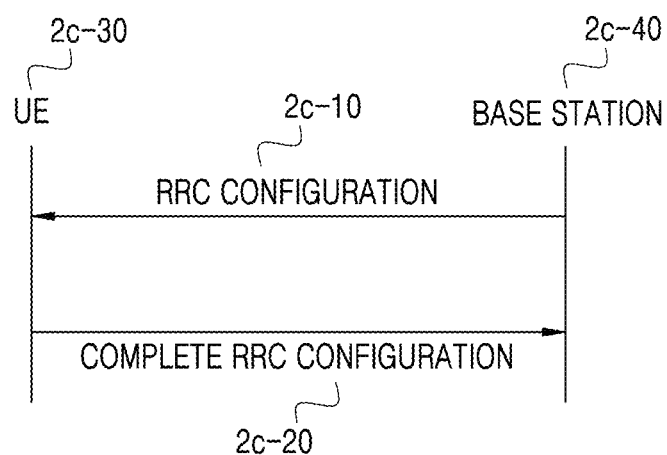
FIG. 16 is a diagram illustrating a method of configuring a data radio bearer (DRB) set for packet duplication, according to an embodiment of the disclosure.

FIG. 16 is a diagram illustrating a method of configuring a DRB set for packet duplication, according to an embodiment of the disclosure.

A base station 2*c*-40 may create or modify a radio bearer by using an RRC configuration message 2*c*-10. In this case, packet duplication transmission may be configured in the radio bearer. In this case, a DRB ID of each radio bearer and a logical channel ID corresponding to each RLC entity may be set, and a radio bearer including one PDCP entity and two or more RLC entities may be configured as described above with reference to FIG. 14 or 15 by matching the IDs. In this case, among the RLC entities, a primary RLC entity and a secondary RLC entity may be separately set. In an embodiment of the disclosure, it is possible to configure which packet duplication activation/deactivation MAC CE of a cell group (or MAC entity) is used to indicate activation or deactivation of packet duplication transmission performed in the radio bearer. In an embodiment of the disclosure, it is possible to configure whether to perform UE autonomous packet duplication, in which a UE determines whether to perform packet duplication transmission in a corresponding radio bearer according to a given condition. When three or more RLC entities as described above with reference to FIG. 15 are configured, an RLC entity to be used for actual packet duplication transmission may be configured. After receiving a corresponding configuration message and completing a change of a UE configuration, a UE 2*c*-30 may inform a base station 2*c*-40 of completion of RRC configuration through an RRC configuration completion message 2*c*-20.

Figure 17:
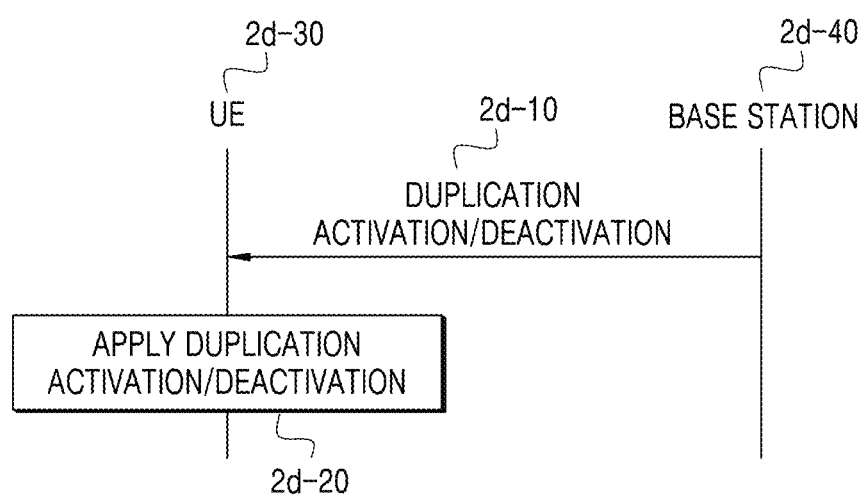
FIG. 17 is a diagram illustrating a method of controlling activation and deactivation of packet duplication by a base station, according to an embodiment of the disclosure.

FIG. 17 is a diagram illustrating a method of controlling activation and deactivation of packet duplication by a base station, according to an embodiment of the disclosure.

Packet duplication transmission is performed by transmitting the same packet by using two or more RLC entities and thus consumption of radio resources increases. It is not desirable to always perform packet duplication because use of a radio resource may be ineffective. Accordingly, packet duplication transmission may be performed only when necessary, and actually performing packet duplication in a radio bearer for which packet duplication is configured is referred to as activation of packet duplication. Conversely, not performing packet duplication in a radio bearer for which packet duplication is configured is referred to as deactivation of packet duplication.

A base station 2*d*-40 may transmit a packet duplication activation/deactivation message 2*d*-10 to a UE 2*d*-30. For packet duplication activation/deactivation, the same type of message or different types of messages may be used. Alternatively, packet duplication activation/deactivation may be identified using a value included in this message. In an embodiment of the disclosure, the packet duplication activation/deactivation message 2*d*-10 may be in the form of a bitmap to be described with reference to FIG. 19 below. The packet duplication activation/deactivation message 2*d*-10 may indicate a radio bearer for which packet duplication is to be activated or deactivated, and after receiving this message, the UE 2*d*-30 may activate or deactivate packet duplication according to an indication included in this message (2*d*-20).

Figure 18:
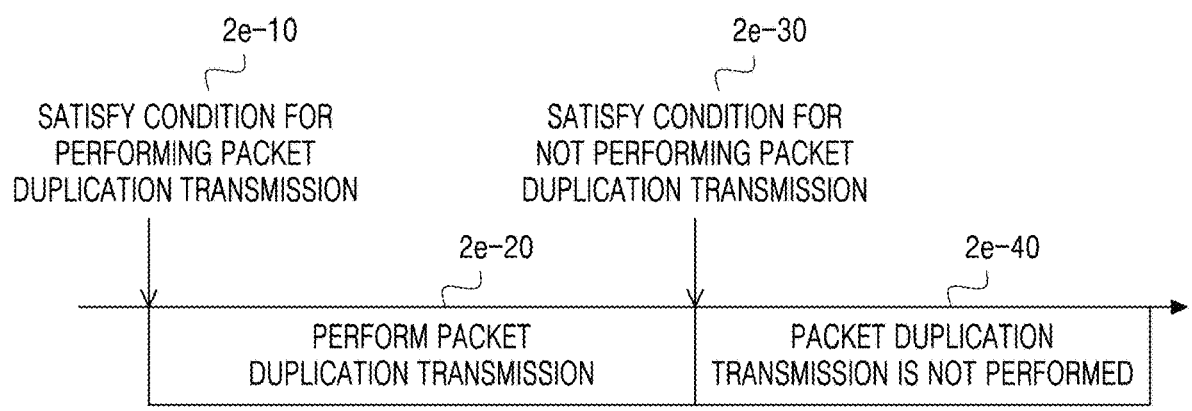
FIG. 18 is a diagram illustrating a method of performing autonomous packet duplication transmission by a UE, according to an embodiment of the disclosure.

FIG. 18 is a diagram illustrating a method of performing autonomous packet duplication transmission by a UE, according to an embodiment of the disclosure.

Whether the UE is to perform packet duplication transmission in an uplink may be determined by a base station but this method may be effective only when the base station has sufficient information about a situation of the UE. When the base station does not have sufficient information, it may be inefficient to activate or deactivate packet duplication transmission according to a decision of the base station. In addition, it will take a lot of time for the UE to transmit necessary information to the base station for activation or deactivation of packet duplication transmission and for the base station to make a decision, based on the information. Accordingly, packet duplication transmission may be effectively performed by UE autonomous packet duplication transmission, in which the UE determines whether to activate packet duplication transmission according to a preset condition.

Figure 19:
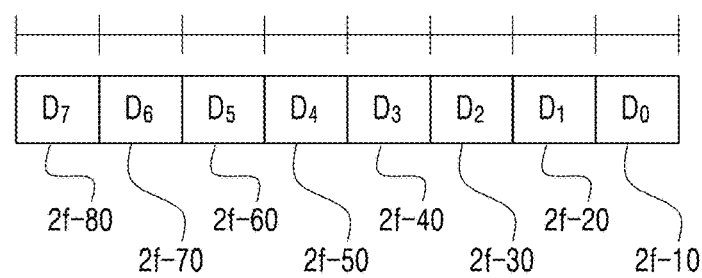
FIG. 19 is a diagram illustrating a packet duplication activation/deactivation message format according to an embodiment of the disclosure.

Referring to FIG. 19, when a preset condition for performing packet duplication transmission is satisfied (2*e*-10), a UE may perform packet duplication transmission (2*e*-20). In this case, the preset condition may be a condition as to whether a base station is to perform autonomous packet duplication transmission according to an RRC configuration as defined with reference to FIG. 16. In the RRC configuration, for the UE, the base station may set a condition as to whether to activate autonomous packet duplication transmission, i.e., a condition for actually performing packet duplication transmission. The condition may be determined by a measurement result of a link of a cell performing packet duplication transmission, QoS requirements of an individual packet or a corresponding DRB, QoS requirements of a corresponding QoS flow, an activation state of a cell, a link status of a physical layer such as a CQI or CSI, and the like. When the preset condition for performing packet duplication transmission is not satisfied while the UE performs packet duplication transmission because the preset condition was satisfied or when a condition for not performing packet duplication transmission is satisfied (2*e*-30), the UE may not perform packet duplication transmission (2*e*-40).

FIG. 19 is a diagram illustrating a packet duplication activation/deactivation message format according to an embodiment of the disclosure.

Referring to FIG. 19, in an embodiment of the disclosure, it is assumed that a message has a MAC CE format consisting of a 1-byte bitmap, i.e., eight bitmaps 2*f*-10, 2*f*-20, 2*f*-30, 2*f*-40, 2*f*-50, 2*f*-60, 2*f*-70, and 2*f*-80. A bit of each of the bitmaps indicates an activation or deactivation status of packet duplication transmission for a certain radio bearer, wherein 1 may indicate activation and 0 may indicate deactivation. In FIG. 19, the eight bitmaps may indicate packet duplication activation/deactivation states of up to eight radio bearers. In this case, a preset rule may be applied to indicate a radio bearer with each bit in the packet duplication activation/deactivation message. One of the following rules may be applied:

1) a bitmap should be indicated such that IDs of DRBs which include RLC entities connected to a cell group to which a corresponding MAC CE is transmitted and in which packet duplication is configured, are presented in ascending or descending order;
2) a bitmap should be indicated such that IDs of DRBs which include RLC entities connected to a cell group to which a corresponding MAC CE is transmitted and in which packet duplication is configured, are presented in ascending or descending order;
3) a bitmap should be indicated such that IDs of DRBs which include secondary RLC entities connected to a cell group to which a corresponding MAC CE is transmitted and in which packet duplication is configured, are presented in ascending or descending order;
4) a bitmap should be indicated such that IDs of DRBs which include PDCP anchors of a base station at a node of the base station corresponding to a cell group to which a corresponding MAC CE is transmitted and in which packet duplication is configured, are presented in ascending or descending order;
5) a bitmap should be indicated such that IDs of DRBs which include a security key of a node of a base station corresponding to a cell group to which a corresponding MAC CE is transmitted and in which packet duplication is configured, are presented in ascending or descending order;
6) a bitmap should be indicated such that IDs of DRBs in which indication of activation/deactivation of packet duplication transmission is configured in advance by a base station through a corresponding MAC CE and packet duplication is configured, are presented in ascending or descending order;
7) a bitmap should be indicated such that IDs of DRBs in which CA type packet duplication is configured by an MCG in the case of a MAC CE to be transmitted to the MCG, and DRBs in which DC type packet duplication is configured are presented in ascending or descending order; and IDs of DRBs in which CA type packet duplication is configured by an SCG in the case of a MAC CE to be transmitted to the SCG are presented in ascending or descending order;
8) a location of a bitmap of a certain MAC CE should be designated by a base station;
9) a bitmap should be indicated such that IDs of DRBs which include RLC entities connected to a cell group to which a corresponding MAC CE is transmitted and in which packet duplication is configured and autonomous packet duplication is not configured, are presented in ascending or descending order;
10) a bitmap should be indicated such that IDs of DRBs which include primary RLC entities connected to a cell group to which a corresponding MAC CE is transmitted and in which packet duplication is configured and autonomous packet duplication is not configured, are presented in ascending or descending order;
11) a bitmap should be indicated such that IDs of DRBs which include secondary RLC entities connected to a cell group to which a corresponding MAC CE is transmitted and in which packet duplication is configured and autonomous packet duplication is not configured, are presented in ascending or descending order;
12) a bitmap should be indicated such that IDs of DRBs which include PDCP anchors of a base station at a node of the base station corresponding to a cell group to which a corresponding MAC CE is transmitted and in which packet duplication is configured and autonomous packet duplication is not configured, are presented in ascending or descending order;
13) a bitmap should be indicated such that IDs of DRBs which include a security key of a base station corresponding to a cell group to which a corresponding MAC CE is transmitted and in which packet duplication is configured and autonomous packet duplication is not configured, are presented in ascending or descending order;
14) a bitmap should be indicated such that IDs of DRBs in which indication of activation/deactivation of packet duplication transmission is configured in advance by a base station through a corresponding MAC CE, packet duplication is configured, and autonomous packet duplication is not configured, are presented in ascending or descending order; and
15) a bitmap should be indicated such that IDs of DRBs in which CA type packet duplication is configured by an MCG in the case of a MAC CE to be transmitted to the MCG and autonomous packet duplication is not configured, and DRBs in which DC type packet duplication is configured and autonomous packet duplication is not configured are presented in ascending or descending order; and IDs of DRBs in which CA type packet duplication is configured by an SCG in the case of a MAC CE to be transmitted to the SCG and autonomous packet duplication is not configured are presented in ascending or descending order.

Figure 20:
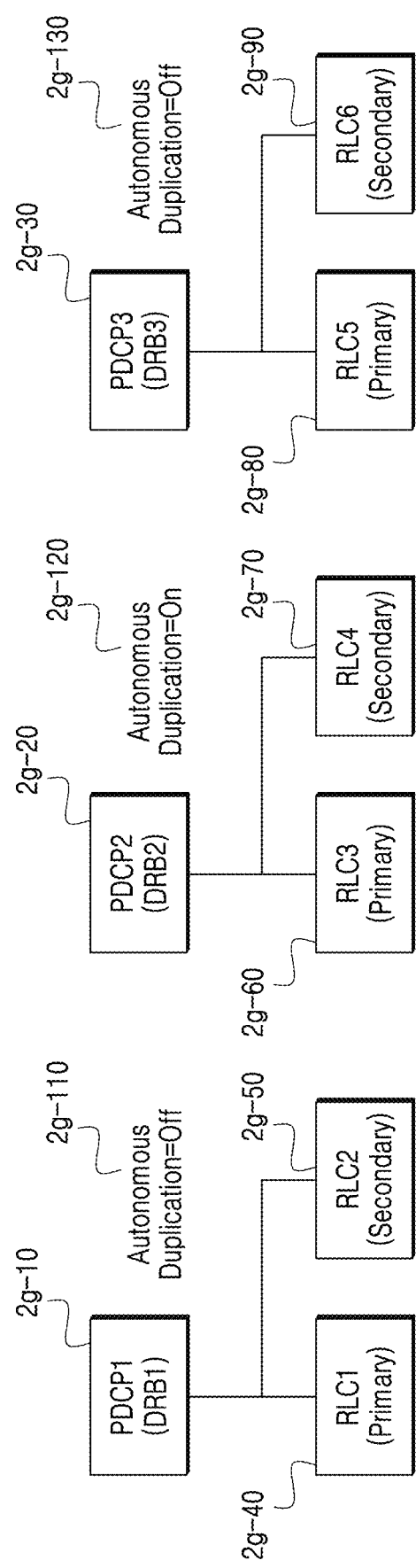
FIG. 20 is a diagram illustrating a radio bearer for which packet duplication transmission is configured, according to an embodiment of the disclosure.

FIG. 20 is a diagram illustrating a radio bearer for which packet duplication transmission is configured, according to an embodiment of the disclosure.

Referring to FIG. 20, it is assumed that three DRBs, i.e., a first DRB 2g-10, a second DRB 2g-20, and a third DRB 2g-30, are configured and each of them corresponds to one PDCP entity. Packet duplication transmission is performed by duplicating one packet at a PDCP layer of a transmitter and transferring duplicated packet to different RLC entities. To this end, two or more RLC entities corresponding to one PDCP are necessary for a DRB in which packet duplication transmission is set. In FIG. 20, a first PDCP 2g-10 is connected to a first RLC 2g-40 and a second RLC 2g-50, a second PDCP 2g-20 is connected to a third RLC 2g-60 and a fourth RLC 2g-70, and a third PDCP3 2g-30 is connected to a fifth RLC 2g-80 and a sixth RLC 2g-90. RLC entities connected to one PDCP entity may be classified into a primary RLC entity and a secondary RLC entity. The primary RLC entity is an RLC entity that performs packet transmission at the PDCP layer of the transmitter regardless of whether packet duplication is activated, and the secondary RLC entity performs packet transmission at the PDCP layer of the transmitter only when packet duplication is activated. In FIG. 20, it is assumed that a primary RLC of a first DRB is the first RLC 2g-40, a primary RLC of a second DRB is the third RLC 2g-60, and a primary RLC of a third DRB is the fifth RLC 2g-80.

In this case, in the case of a radio bearer for which packet duplication transmission is performed, autonomous packet duplication transmission may be configured or may not be configured. In FIG. 20, it is assumed that autonomous packet duplication transmission is not configured for the first DRB 2g-10 and the third DRB 2g-30 (2g-110 and 2g-130) and is configured for the second DRB 2g-20 (2g-120). The configuration of autonomous packet duplication transmission may be applied to the RRC configuration message of FIG. 16. In an embodiment of the disclosure, autonomous packet duplication transmission may be configured by a MAC CE designed for this purpose. As described above, when autonomous packet duplication transmission is configured for a radio bearer, the radio bearer cannot control activation/deactivation of packet duplication transmission through a packet duplication activation/deactivation message as described above with reference to FIGS. 17 and 19. In this case, one of the following methods may be used to apply the packet duplication activation/deactivation message of FIG. 19.

1) In the case of a radio bearer performing autonomous packet duplication transmission, a bitmap indicating whether to activate packet duplication by the radio bearer may not be included in the packet duplication transmission activation/deactivation message. In other words, a packet duplication activation/deactivation bitmap may be provided for a radio bearer for which autonomous packet duplication transmission is not configured and packet duplication transmission is configured. In an embodiment of the disclosure, a bitmap may be determined such that IDs of radio bearers in which autonomous packet duplication transmission is not configured and packet duplication transmission is configured are presented in ascending or descending order.

2) In the case of a radio bearer performing autonomous packet duplication transmission, a bitmap indicating whether to activate packet duplication by the radio bearer may be included in the packet duplication transmission activation/deactivation message but whether to activate packet duplication transmission may be indicated in a corresponding field. In other words, whether to activate packet duplication transmission may be indicated with respect to a radio bearer, in which autonomous packet duplication transmission is not configured and packet duplication transmission is configured, through a packet duplication activation/deactivation bitmap.

3) In the case of a radio bearer performing autonomous packet duplication transmission, a bitmap indicating whether to activate packet duplication by the radio bearer may be included in the packet duplication transmission activation/deactivation message but autonomous packet duplication transmission may be canceled when whether to activate packet duplication transmission is indicated in a corresponding field. Thereafter, the radio bearer does not perform autonomous packet duplication transmission.

In operations corresponding to the above-described methods 1) to 3), a radio bearer including a bitmap in each MAC CE may correspond only to a DRB including at least one RLC entity in a corresponding MAC entity.

Figure 21:
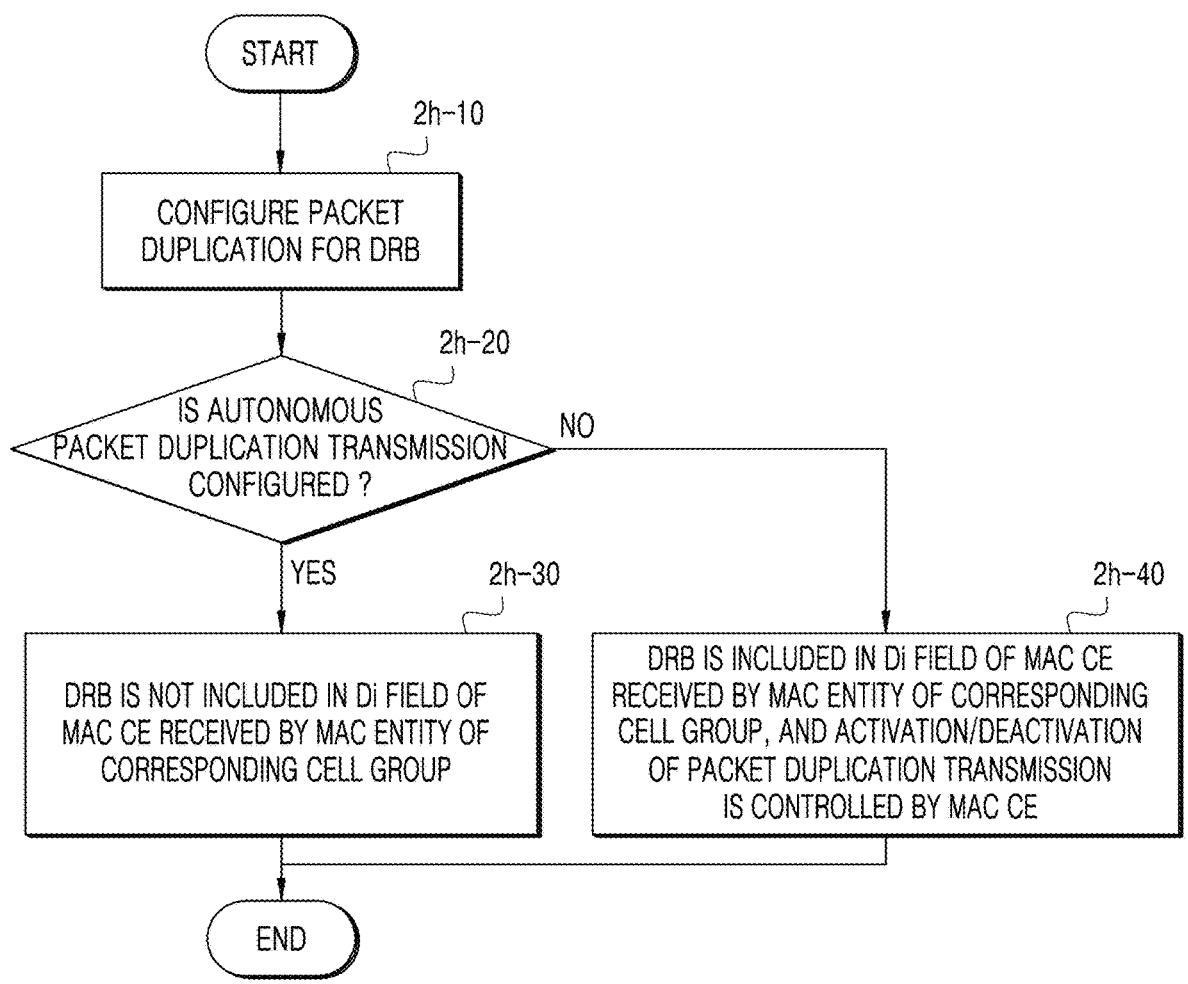
FIG. 21 is a diagram illustrating a method of identifying a duplication activation/deactivation message for applying an activation or deactivation state of a radio bearer, according to an embodiment of the disclosure.

FIG. 21 is a diagram illustrating a method of identifying a duplication activation/deactivation message for applying an activation or deactivation state of a radio bearer, according to an embodiment of the disclosure.

It may be assumed that a format of the packet duplication activation/deactivation message uses the MAC CE format described above with reference to FIG. 19. When packet duplication is configured for a DRB (2h-10), a UE may check whether autonomous packet duplication is configured for the DRB (2h-20). Whether autonomous packet duplication transmission is configured for the DRB may be determined by the RRC configuration of FIG. 16 or the packet duplication activation/deactivation message of FIG. 17. In this case, when autonomous packet duplication transmission is configured for the DRB, a bitmap of a MAC CE received by an MAC entity of a corresponding cell group, i.e., Di fields 2f-10, 2f-20, 2f-30, 2f-40, 2f-50, 2f-60, 2f-70, and 2f-80 illustrated in FIG. 19, may not include a field indicating whether to activate packet duplication of the DRB (2h-30). Alternatively, when autonomous packet duplication transmission is not configured for the DRB, the bitmap of the MAC CE received by the MAC entity of the corresponding cell group, i.e., the Di fields 2f-10, 2f-20, 2f-30, 2f-40, 2f-50, 2f-60, 2f-70, and 2f-80 illustrated in FIG. 19, may include the field indicating whether to activate packet duplication of the DRB (2h-40). In this case, whether to activate packet duplication transmission may be controlled by a packet duplication activation/deactivation MAC CE.

Figure 22:
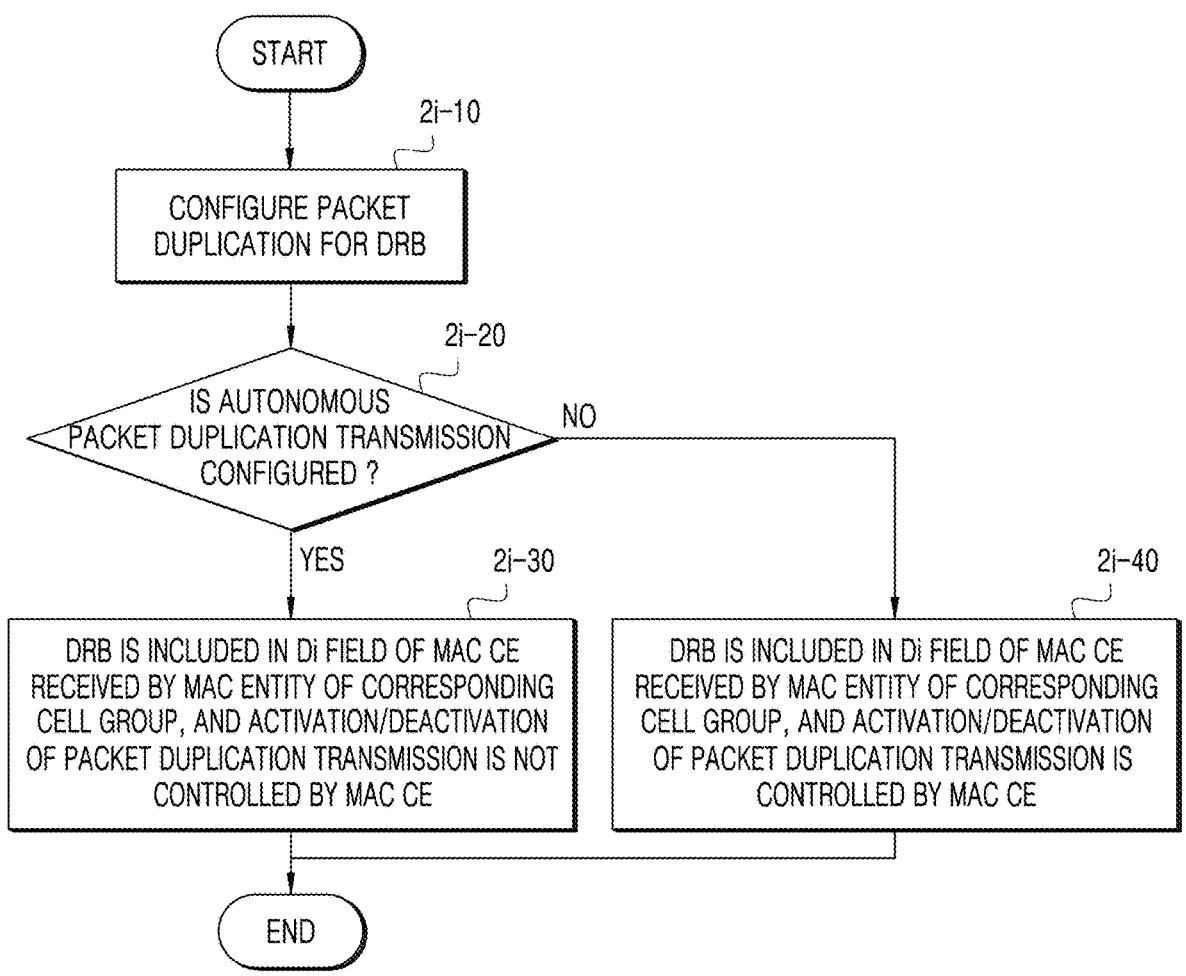
FIG. 22 is a diagram illustrating a method of identifying a duplication activation/deactivation message for applying an activation/deactivation state of a radio bearer, according to another embodiment of the disclosure.

FIG. 22 is a diagram illustrating a method of identifying a duplication activation/deactivation message for applying an activation or deactivation state of a radio bearer, according to another embodiment of the disclosure.

It may be assumed that a format of the packet duplication activation/deactivation message uses the MAC CE format described above with reference to FIG. 19. When packet duplication is configured for a DRB (2i-10), a UE may check whether autonomous packet duplication is configured for the DRB (2i-20). Whether autonomous packet duplication transmission is configured for the DRB may be determined by the RRC configuration of FIG. 16 or the packet duplication activation/deactivation message of FIG. 17. In this case, when autonomous packet duplication transmission is configured for the DRB, a bitmap of a MAC CE received by an MAC entity of a corresponding cell group, i.e., the Di fields 2f-10, 2f-20, 2f-30, 2f-40, 2f-50, 2f-60, 2f-70, and 2f-80 illustrated in FIG. 19, may include a field indicating whether to activate packet duplication of the DRB but activation/deactivation of packet duplication transmission may not be controlled by the MAC CE (2i-30). In this case, a base station may set a bit indicating whether to activate packet duplication for a radio bearer, in which autonomous packet duplication is configured, to a preset value, e.g., 0 or 1, or an arbitrary value, and transmit the set bit. The UE may ignore a value of the field and may not apply the value of the field to activation of packet duplication transmission. Alternatively, when autonomous packet duplication transmission is not configured for the DRB, the bitmap of the MAC CE received by the MAC entity of the corresponding cell group, i.e., the Di fields 2f-10, 2f-20, 2f-30, 2f-40, 2f-50, 2f-60, 2f-70, and 2f-80 illustrated in FIG. 19, may include the field indicating whether to activate packet duplication of the DRB (2i-40). In this case, whether to activate packet duplication transmission may be controlled by a packet duplication activation/deactivation MAC CE.

Figure 23:
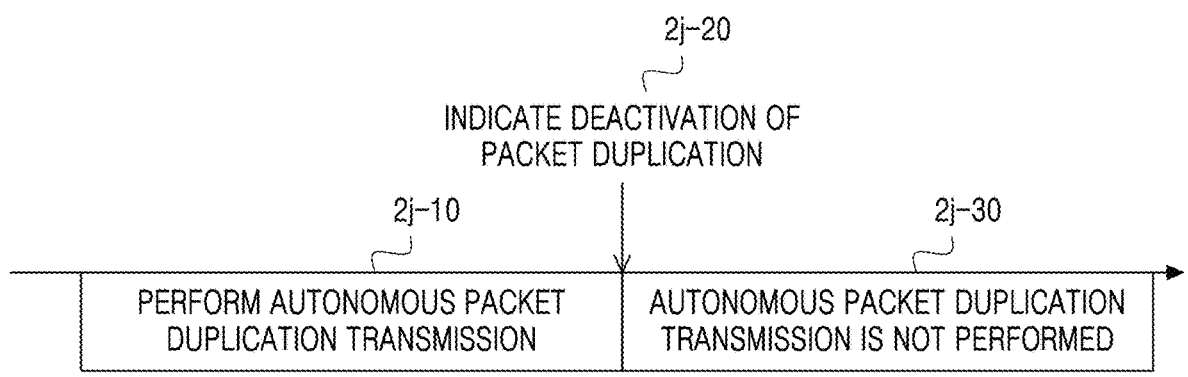
FIG. 23 is a diagram illustrating a method of canceling autonomous packet duplication transmission by a UE, according to an embodiment of the disclosure.

FIG. 23 is a diagram illustrating a method of canceling autonomous packet duplication transmission by a UE, according to an embodiment of the disclosure.

Referring to FIG. 23, in an embodiment of the disclosure, it is assumed that autonomous packet duplication transmission is configured for a radio bearer and thus packet duplication transmission is being performed (2j-20). In this case, deactivation of packet duplication for the radio bearer may be indicated by a base station (2j-20). In this case, deactivation of packet duplication for the radio bearer may be indicated by a packet duplication activation/deactivation message as described above with reference to FIGS. 17 and 19. Because the UE is performing autonomous packet duplication transmission for the radio bearer, when the base station indicates deactivation of packet duplication for the radio bearer, it may be understood that packet duplication transmission is not necessary for the radio bearer. In this case, the UE may stop performing autonomous packet duplication transmission and activation of packet duplication transmission may be controlled by the base station. Therefore, the UE may not perform autonomous packet duplication transmission and may operate in a deactivation state with respect to packet duplication transmission (2*j*-30).

Figure 24:
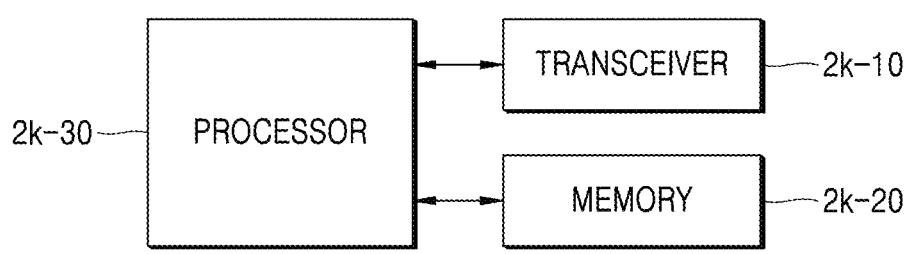
FIG. 24 is a block diagram illustrating a configuration of a UE according to an embodiment of the disclosure.

FIG. 24 is a block diagram illustrating a configuration of a UE according to an embodiment of the disclosure.

As illustrated in FIG. 24, the UE of an embodiment of the disclosure may include a transceiver 2*k*-10, a memory 2*k*-20, and a processor 2*k*-30. However, components of the UE are not limited thereto. For example, the UE may include more components or fewer components than the components described above. Alternatively, the processor 2*k*-30, the transceiver 2*k*-10, and the memory 2*k*-20 may be embodied as one chip.

The transceiver 2*k*-10 may transmit signals to and receive signals from a base station. The signals transmitted to and received from the base station may include control information and data. The transceiver 2*k*-10 may include an RF transmitter that up-converts and amplifies a frequency of a signal to be transmitted, an RF receiver that low-noise amplifies a received signal and down-converts a frequency of the received signal, and the like. However, the above components of the transceiver 2*k*-10 are only examples and components of the transceiver 2*k*-10 are not limited to the RF transmitter and the RF receiver. The transceiver 2*k*-10 may receive a signal and output the signal to the processor 2*k*-30 through a radio channel, and transmit a signal output from the processor 2*k*-30 through the radio channel.

In some embodiments of the disclosure, the memory 2*k*-20 may store programs and data necessary for an operation of the UE. The memory 2*k*-20 may store control information or data included in a signal transmitted from or received by the UE. The memory 2*k*-20 may include a storage medium, such as a ROM, a RAM, a hard disk, a CD-ROM, and a DVD, or a combination of such storage media. Alternatively, a plurality of memories 2*k*-20 may be provided. According to some embodiments of the disclosure, the memory 2*k*-20 may store a program for monitoring a low power mode indicator and a PDCCH according to the embodiments of the disclosure described above.

In some embodiments of the disclosure, the processor 2*k*-30 may control a series of processes for operating a UE according to the above-described embodiments of the disclosure. For example, components of the UE may be controlled to perform the operation of the UE according to an embodiment of the disclosure. A plurality of processors 2*k*-30 may be provided. The processor 2*k*-30 may perform an operation of the UE by executing the program stored in the memory 2*k*-20.

Figure 25:
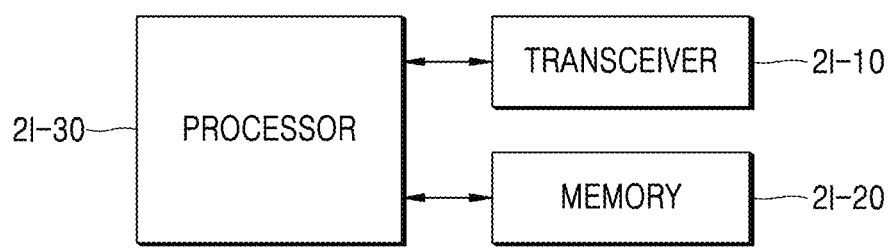
FIG. 25 is a block diagram illustrating a configuration of a base station according to an embodiment of the disclosure.

FIG. 25 is a block diagram illustrating a configuration of a base station according to an embodiment of the disclosure.

As illustrated in FIG. 25, the base station according to an embodiment of the disclosure may include a processor 2*l*-30, a transceiver 2*l*-10, and a memory 2*l*-20. However, components of the base station are not limited thereto. For example, the base station may include more components or fewer components than the components described above. Alternatively, the processor 2*l*-30, the transceiver 2*l*-10, and the memory 2*l*-20 may be embodied as one chip.

The transceiver 2*l*-10 may transmit signals to and receive signals from a UE. The signals transmitted to and received from the UE may include control information and data. The transceiver 2*k*-10 may include an RF transmitter that up-converts and amplifies a frequency of a signal to be transmitted, an RF receiver that low-noise amplifies a received signal and down-converts a frequency of the received signal, and the like. However, the above components of the transceiver 2*l*-10 are only examples, and components of the transceiver 2*l*-10 are not limited to the RF transmitter and the RF receiver. The transceiver 2*l*-10 may receive a signal and output the signal to the processor 2*l*-30 through a radio channel, and transmit a signal output from the processor 2*l*-30 through the radio channel.

In some embodiments of the disclosure, the memory 2*l*-20 may store programs and data necessary for an operation of a base station. The memory 2*l*-20 may store control information or data included in a signal transmitted from or received by the base station. The memory 2*l*-20 may include a storage medium, such as a ROM, a RAM, a hard disk, a CD-ROM, and a DVD, or a combination of such storage media. A plurality of memories 2*l*-20 may be provided. According to some embodiments of the disclosure, the memory 2*l*-20 may store a program for performing an operation of a base station according to the above-described embodiments of the disclosure.

The processor 2*l*-30 may control a series of processes to operate the base station according to the above-described embodiments of the disclosure. For example, components of the base station may be controlled to perform the operation of the base station according to an embodiment of the disclosure. A plurality of processors 2*l*-30 may be provided. The processor 2*l*-30 may perform an operation of a base station according to the disclosure by executing the program stored in the memory 2*l*-20.

The methods according to the embodiments of the disclosure described in the claims or specification of the disclosure may be implemented by hardware, software, or a combination of hardware and software.

When the methods are implemented by software, a non-transitory computer-readable storage medium or a computer program product storing one or more programs (software modules) may be provided. The one or more programs stored in the non-transitory computer-readable storage medium of the computer program product are configured to be executable by one or more processors included in an electronic device. The one or more programs include instructions that cause an electronic device to execute the methods according to the embodiments of the disclosure set forth in the claims or specification.

Such programs (software modules or software) may be stored in a random access memory, a non-volatile memory such as flash memory, a read-only memory (ROM), an electrically erasable programmable ROM (EEPROM), a magnetic disc storage device, a compact disc-ROM (CD-ROM), a digital versatile disc (DVD), other types of optical storage devices, or a magnetic cassette. Otherwise, such programs may be stored in a memory which is a combination of some or all the above storage media. Alternatively, a plurality of such memories may be provided.

The programs may be stored in an attachable storage device accessible via communication networks such as the Internet, an Intranet, a local area network (LAN), a wide LAN (WLAN) or a storage area network (SAN) or a combination thereof. Such a storage device may be connected to a device performing embodiments of the disclosure through an external port. Otherwise, a separate storage device in a communication network may be connected to a device that performs embodiments of the disclosure.

In the embodiments of the disclosure described above, each component included in the disclosure is expressed in a singular or plural form according to a presented embodiment of the disclosure. However, singular or plural expressions are appropriately selected according to a situation described for convenience of description and the disclosure is not limited by singular or plural components. Even components expressed in a plural form may be embodied in a singular form or even components expressed in a singular form may be embodied in a plural form.

The embodiments of the disclosure set forth in the present specification and drawings are merely intended to provide examples to easily explain the technical matters of the disclosure and help understanding of the disclosure, and are not intended to limit the scope of the disclosure. That is, it will be obvious to those of ordinary skill in the art that other modified examples based on the technical spirit of the disclosure may be implemented. These embodiments of the disclosure may be implemented in combination as necessary. For example, part of an embodiment of the disclosure and part of another embodiment of the disclosure may be combined. In addition, modified examples based on the technical idea of the above-described embodiments of the disclosure may be implemented in other systems. e.g., an LTE system or a 5G or NR system.

What is claimed is:

1. A method of performing a conditional handover by a user equipment (UE) supporting vehicle-to-everything (V2X) communication, the method comprising:
    transmitting a measurement report to a first base station;
    receiving a radio resource control (RRC) reconfiguration message from the first base station, wherein the RRC reconfiguration message comprises information regarding at least one execution condition for the conditional handover and resource pool configuration information for new radio (NR) V2X;
    identifying a target cell for execution of the conditional handover, based on the information regarding the at least one execution condition for the conditional handover;
    performing the V2X communication based on the resource pool configuration information for NR V2X; and
    transmitting an RRC reconfiguration complete message to a second base station,
    wherein the resource pool configuration information for NR V2X comprises exceptional resource pool configuration information for NR V2X.

2. The method of claim 1,
    wherein the RRC reconfiguration message further comprises information regarding at least one target cell, and
    wherein the information regarding the at least one execution condition for the conditional handover comprises at least one of:
    a threshold associated with a serving cell; a threshold associated with a target cell; or a time period in which quality of the target cell is required to be higher than the threshold associated with the target cell.

3. The method of claim 1, further comprising performing synchronization to the target cell.

4. The method of claim 1, further comprising performing random access to the target cell.

5. The method of claim 1, further comprising transmitting, to the first base station, UE capability information indicating that the UE supports the conditional handover.

6. The method of claim 1,
    wherein the RRC reconfiguration message further comprises resource pool configuration information for long term evolution (LTE) V2X, and the resource pool configuration information for LTE V2X comprises exceptional resource pool configuration information for LTE V2X, and
    wherein the method further comprises:
    performing the V2X communication based on the resource pool configuration information for LTE V2X.

7. A method performed by a first base station in a wireless communication system supporting vehicle-to-everything (V2X) communication, the method comprising:
    receiving a measurement report from a user equipment (UE);
    determining whether to apply a conditional handover for the UE, based on the measurement report;
    transmitting a handover request message to at least one second base station;
    receiving a handover request acknowledge message from the second base station; and
    transmitting a radio resource control (RRC) reconfiguration message to the UE,
    wherein the RRC reconfiguration message comprises information regarding at least one execution condition for the conditional handover and resource pool configuration information for new radio (NR) V2X,
    wherein a target cell for execution of the conditional handover is identified based on the information regarding the at least one execution condition for the conditional handover, and
    wherein the resource pool configuration information for NR V2X comprises exceptional resource pool configuration information for NR V2X.

8. The method of claim 7,
    wherein the RRC reconfiguration message further comprises information regarding at least one target cell, and
    wherein the information regarding the at least one execution condition for the conditional handover comprises at least one of:
    a threshold associated with a serving cell; a threshold associated with a target cell; or a time period in which quality of the target cell is required to be higher than the threshold associated with the target cell.

9. The method of claim 7, wherein synchronization to the target cell is performed at the UE.

10. The method of claim 7,
    wherein the RRC reconfiguration message further comprises resource pool configuration information for long term evolution (LTE) V2X, and the resource pool configuration information for LTE V2X comprises exceptional resource pool configuration information for LTE V2X.

11. A user equipment (UE) supporting vehicle-to-everything (V2X) communication and configured to perform a conditional handover, the UE comprising:
    a transceiver; and
    a controller coupled with the transceiver and configured to:
        transmit a measurement report to a first base station,
        receive a radio resource control (RRC) reconfiguration message from the first base station, wherein the RRC reconfiguration message comprises information regarding at least one execution condition for the conditional handover and resource pool configuration information for new radio (NR) V2X,
        identify a target cell for execution of the conditional handover, based on the information regarding the at least one execution condition for the conditional handover,
        perform the V2X communication based on the resource pool configuration information for NR V2X, and
        transmit an RRC reconfiguration complete message to a second base station,
    wherein the resource pool configuration information for NR V2X comprises exceptional resource pool configuration information for NR V2X.

12. The UE of claim 11,
wherein the RRC reconfiguration message further comprises information regarding at least one target cell, and
wherein the information regarding the at least one execution condition for the conditional handover comprises at least one of:
a threshold associated with a serving cell; a threshold associated with a target cell; or a time period in which quality of the target cell is required to be higher than the threshold associated with the target cell.

13. The UE of claim 11, wherein the controller is further configured to perform synchronization to the target cell.

14. The UE of claim 11, wherein the controller is further configured to perform random access to the target cell.

15. The UE of claim 11, wherein the controller is further configured to transmit, to the first base station, UE capability information indicating that the UE supports the conditional handover.

16. The UE of claim 11,
wherein the RRC reconfiguration message further comprises resource pool configuration information for long term evolution (LTE) V2X, and the resource pool configuration information for LTE V2X comprises exceptional resource pool configuration information for LTE V2X, and
wherein the controller is further configured to:
perform the V2X communication based on the resource pool configuration information for LTE V2X.

17. A first base station configured to operate in a wireless communication system supporting vehicle-to-everything (V2X) communication, the first base station comprising:
a transceiver; and
a controller coupled with the transceiver and configured to:
receive a measurement report from a user equipment (UE),
determine whether to apply a conditional handover for the UE, based on the measurement report,
transmit a handover request message to at least one second base station,
receive a handover request acknowledge message from the second base station, and
transmit a radio resource control (RRC) reconfiguration message to the UE,
wherein the RRC reconfiguration message comprises information regarding at least one execution condition for the conditional handover and resource pool configuration information for new radio (NR) V2X,
wherein a target cell for execution of the conditional handover is identified based on the information regarding the at least one execution condition for the conditional handover, and
wherein the resource pool configuration information for NR V2X comprises exceptional resource pool configuration information for NR V2X.

18. The first base station of claim 17,
wherein the RRC reconfiguration message further comprises information regarding at least one target cell, and
wherein the information regarding the at least one execution condition for the conditional handover comprises at least one of:
a threshold associated with a serving cell; a threshold associated with a target cell; or a time period in which quality of the target cell is required to be higher than the threshold associated with the target cell.

19. The first base station of claim 17, wherein synchronization to the target cell is performed at the UE.

20. The first base station of claim 17,
wherein the RRC reconfiguration message further comprises resource pool configuration information for long term evolution (LTE) V2X, and the resource pool configuration information for LTE V2X comprises exceptional resource pool configuration information for LTE V2X.

* * * * *